Figure 1:
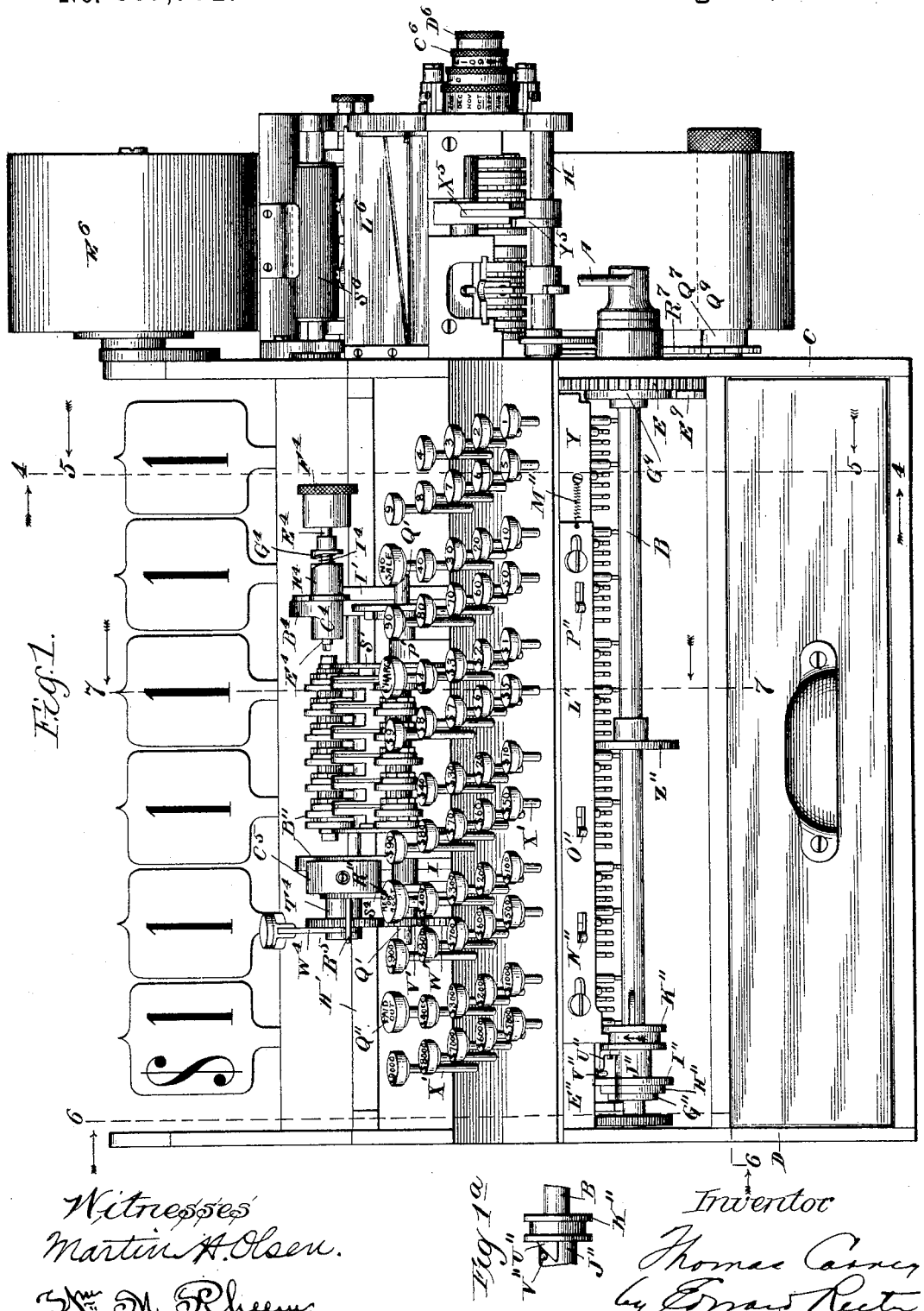

(No Model.) 11 Sheets—Sheet 1.

T. CARNEY.
CASH REGISTER.

No. 587,702. Patented Aug. 10, 1897.

(No Model.)  11 Sheets—Sheet 3.

T. CARNEY.
CASH REGISTER.

No. 587,702.  Patented Aug. 10, 1897.

Witnesses
Martin H. Olsen.
Wm. M. Rheem.

Inventor
Thomas Carney
by Edward Rector
his atty (No Model.) 11 Sheets—Sheet 7.

T. CARNEY.
CASH REGISTER.

No. 587,702. Patented Aug. 10, 1897.

Witnesses.
Inventor.

(No Model.) 11 Sheets—Sheet 9.

T. CARNEY.
CASH REGISTER.

No. 587,702. Patented Aug. 10, 1897.

Witnesses
Wm. M. Rheem
Leonora Wiseman

Inventor
Thomas Carney
by Edward Rector
his Atty.

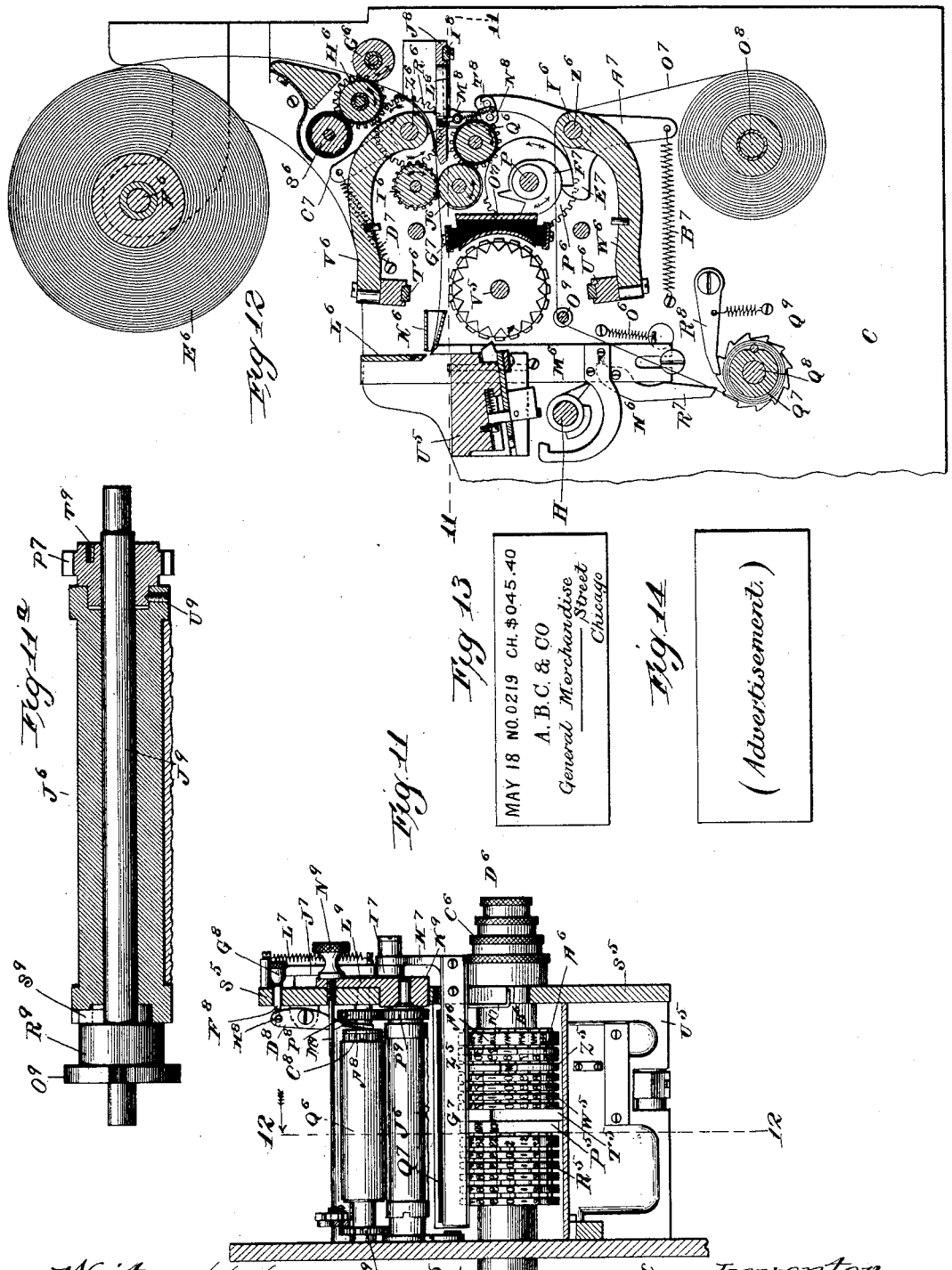

(No Model.)  
11 Sheets—Sheet 11.
T. CARNEY.  
CASH REGISTER.
No. 587,702. Patented Aug. 10, 1897.
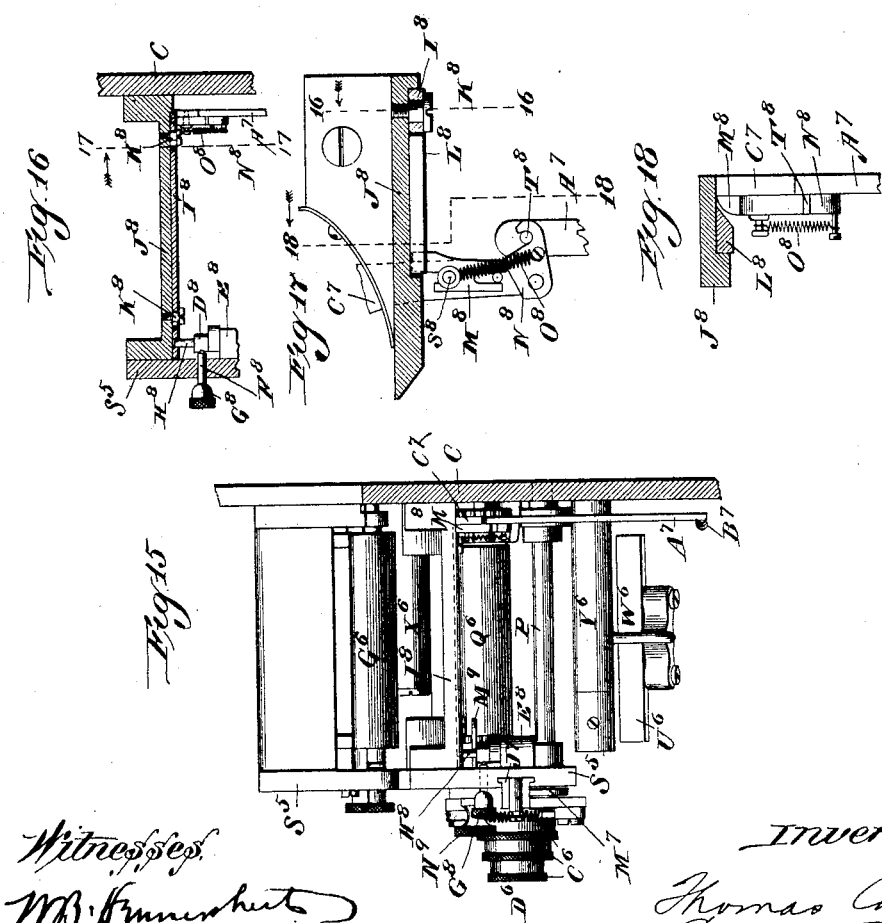

UNITED STATES PATENT OFFICE.

THOMAS CARNEY, OF DAYTON, OHIO, ASSIGNOR TO THE NATIONAL CASH REGISTER COMPANY, OF SAME PLACE.

CASH-REGISTER.

SPECIFICATION forming part of Letters Patent No. 587,702, dated August 10, 1897.

Application filed September 21, 1896. Serial No. 606,526. (No model.)

*To all whom it may concern:*

Be it known that I, THOMAS CARNEY, a citizen of the United States, residing at Dayton, in the county of Montgomery, in the State of Ohio, have invented a certain new and useful Improvement in Cash-Registers, of which the following is a description, reference being had to the accompanying drawings, forming part of this specification.

My invention relates to that class of machines which employ a plurality of registers or sets of registering-wheels for the purpose of making and preserving separate registrations of different classes of sales, or of sales from different departments of a store, or of sales by different clerks in the store, whereby at the end of a day's business the proprietor may ascertain the amount of transactions of each class, or the amount of sales from each of the several departments of the store, or the amount of sales made by the respective clerks in the store.

My invention has for its object the production of a simple and efficient machine in which such separate registrations may be made and preserved and in which the amount of each sale or transaction may be printed upon a paper strip, together with a sign or character indicating the character of the transaction, or the department of the store in which it was made, or the clerk by whom it was made, as the case may be.

The general construction and mode of operation of my new machine are as follows: There is employed a single driving or operating mechanism and a single lot of keys coöperating therewith to determine the movements which the driving mechanism shall impart to any register which may be connected with it. A plurality of registers are mounted in a frame which may be moved to different positions to bring one register or another into position to be actuated by the driving mechanism. There are also employed a series of special keys which coöperate with the driving mechanism and the movable frame carrying the registers in such manner that when any one of said keys is operated or set and the driving mechanism given its usual movement the movable frame will be moved until the register corresponding to such special key has been brought into position to be actuated by the driving mechanism, whereupon the latter will actuate such register and effect the registration upon it of the values of such of the regular keys of the machine as have been operated or set prior to the movement of the driving mechanism. There are also employed a series of type-wheels which are set by the same movement of the driving mechanism which actuates the register and a special type-wheel which is set by the movement of the driving mechanism which actuates the movable frame to bring one register or another into position for the driving mechanism to actuate it, so that at any given operation this special type-wheel is first set to bring to the printing-point a character corresponding to the register which is to be actuated by the driving mechanism, then as such register is actuated the other type-wheels are moved to bring to the printing-point such of their typenumbers as represent the amount of the transaction, and then the printing is effected upon a paper strip by a platen operated by the driving mechanism. The result of this construction and mode of operation is that at each operation of the machine it is only necessary to operate or set the necessary regular or cash keys representing the amount of the transaction and then set the special key representing the character of the transaction or the salesman who made it and then give the driving mechanism its usual movement, whereupon the amount of the transaction will be registered in the proper register and will be also printed upon the paper strip, together with a character or sign indicating the class of the transaction or the salesman who made it.

The novelty of my invention consists in the new constructions, arrangements, combinations, and modes of operation embodied in a machine of the general nature above described, all of which will be hereinafter more fully described, and particularly pointed out in the claims.

Figure 2:
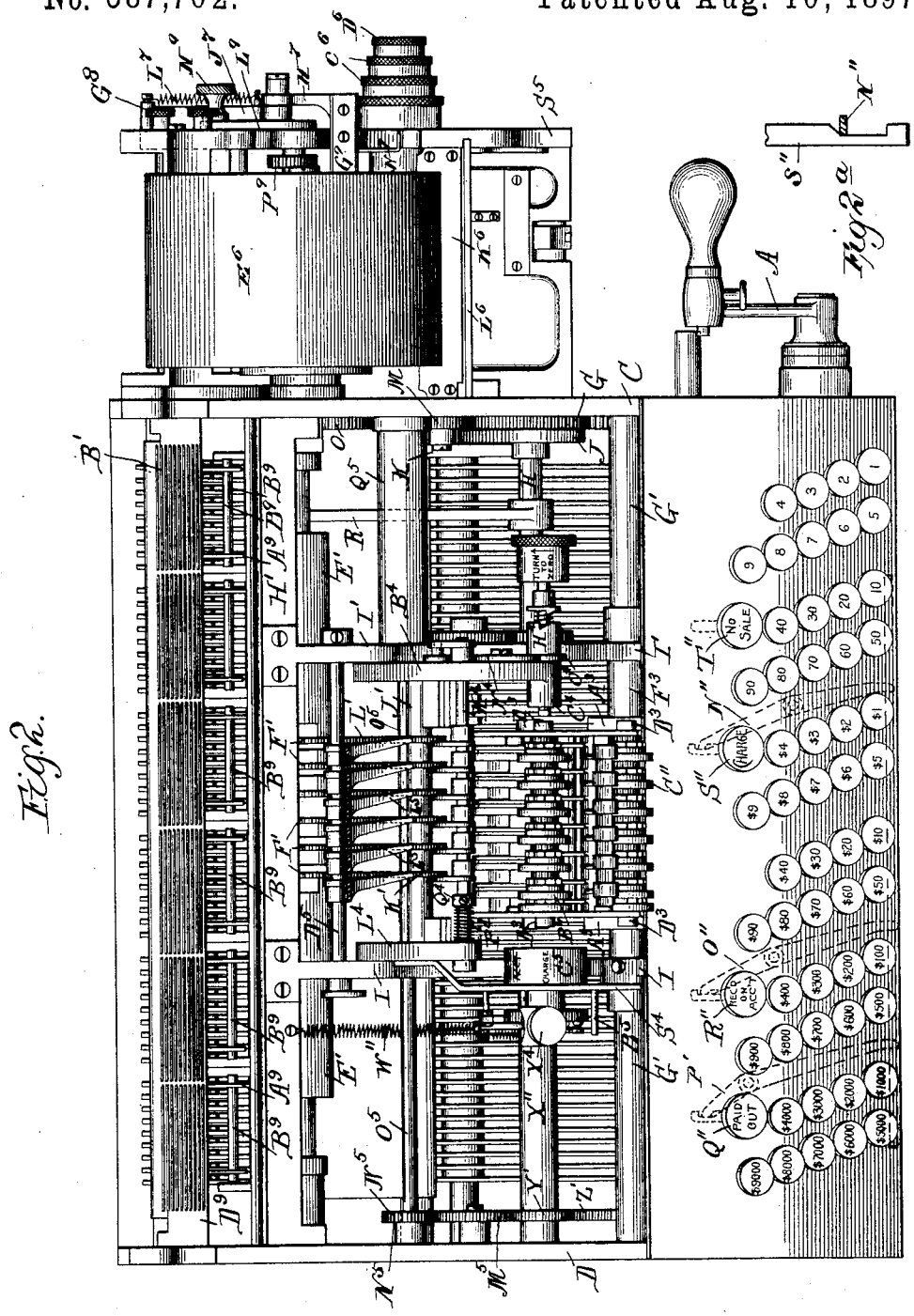
Figure 3:
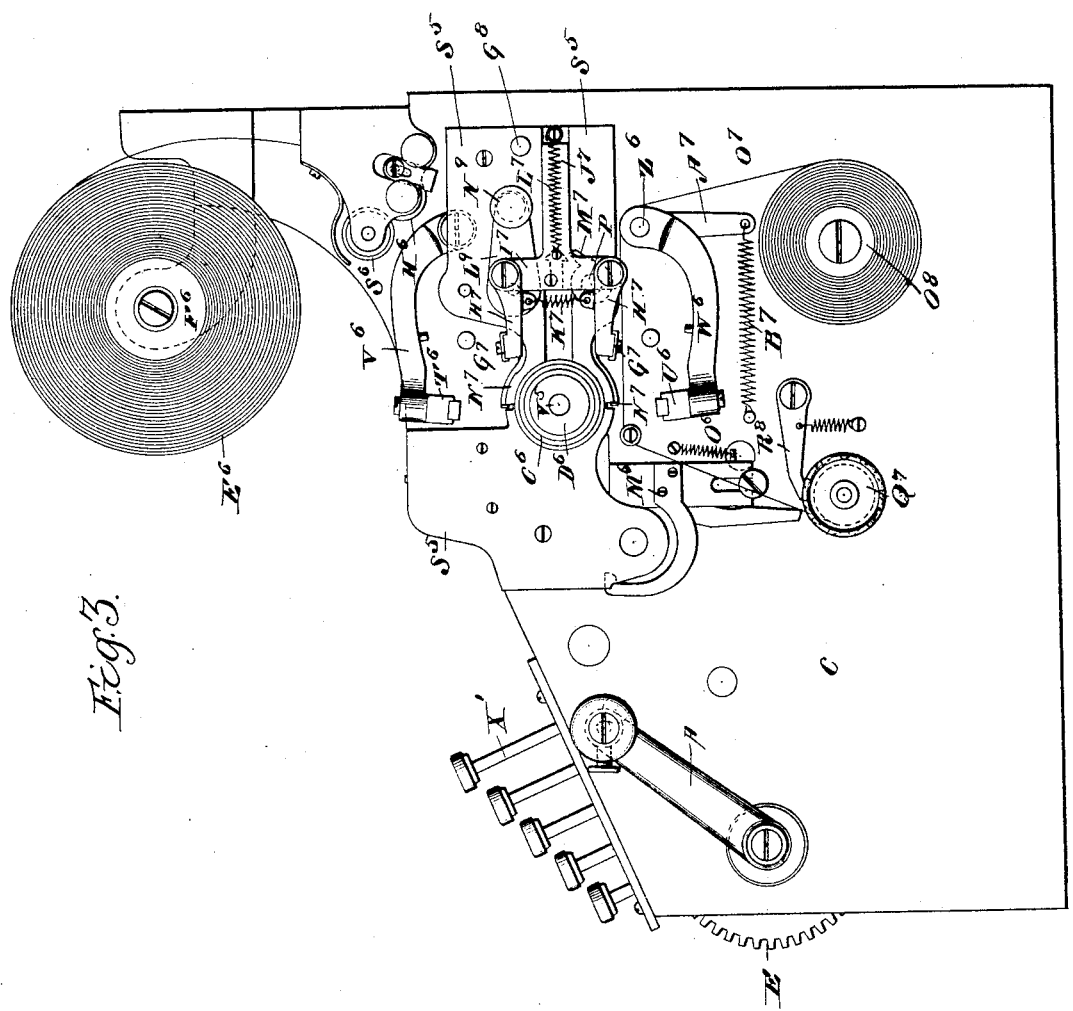
Figure 4:
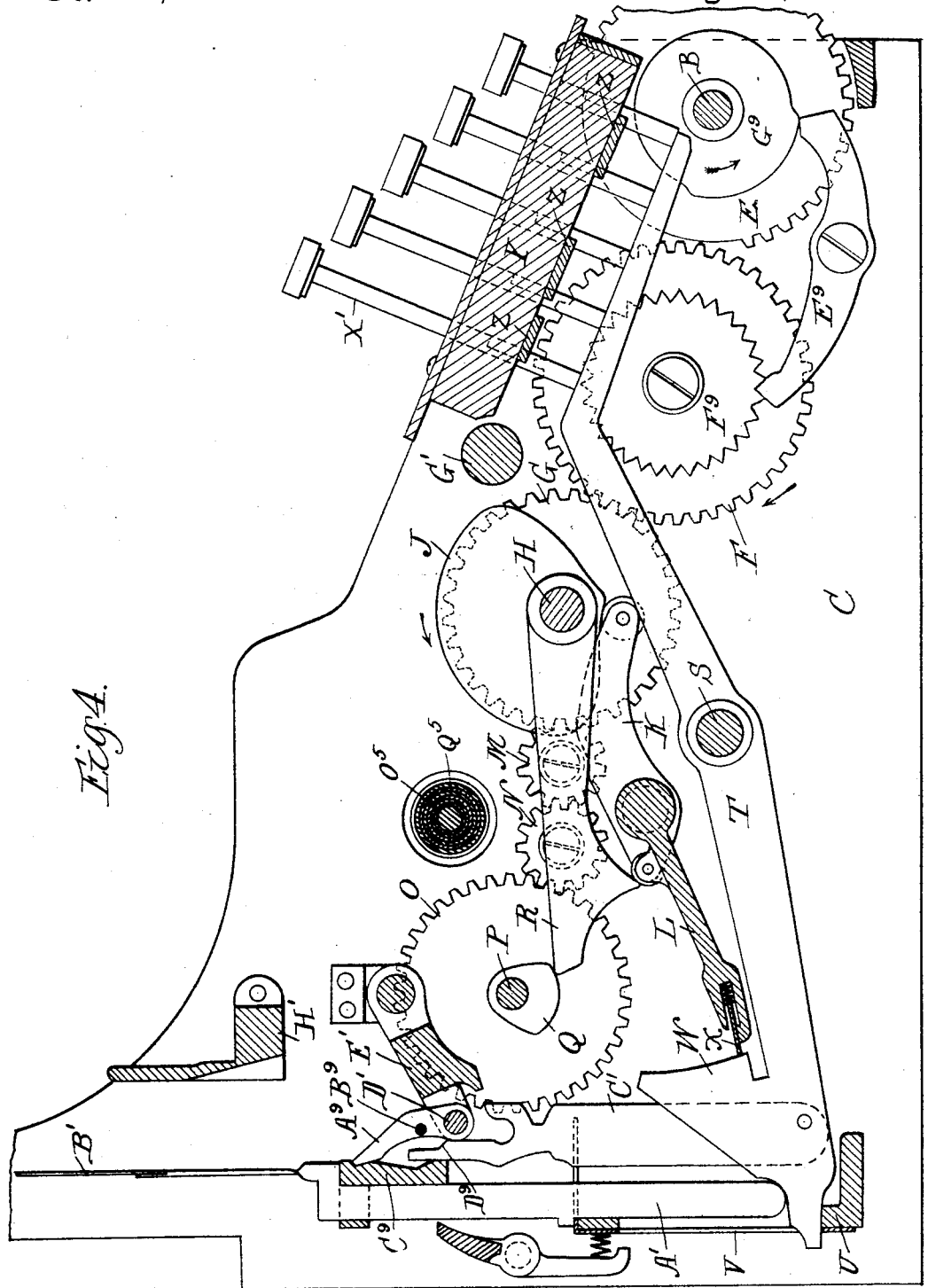
Figure 5:
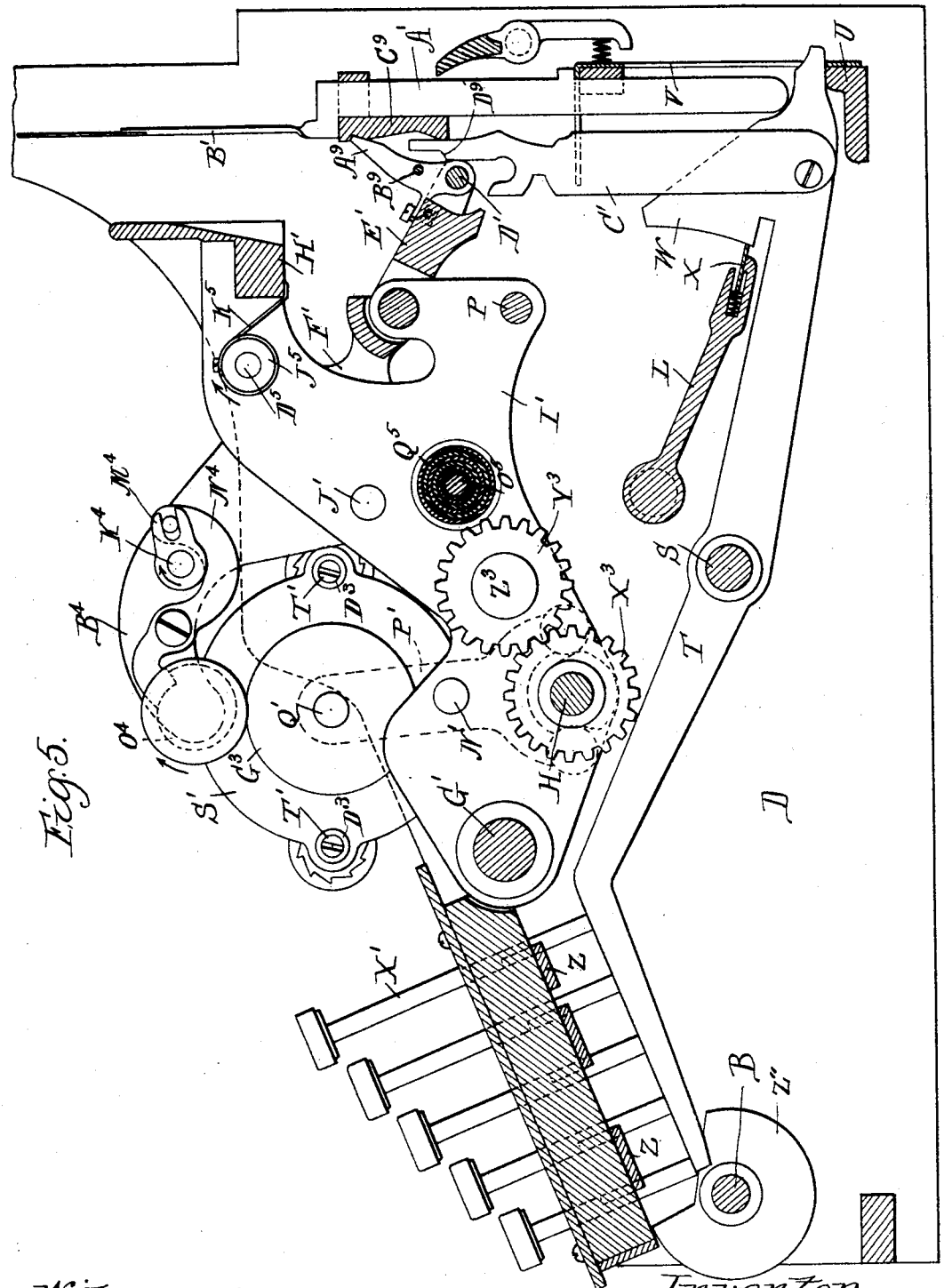
Figure 6:
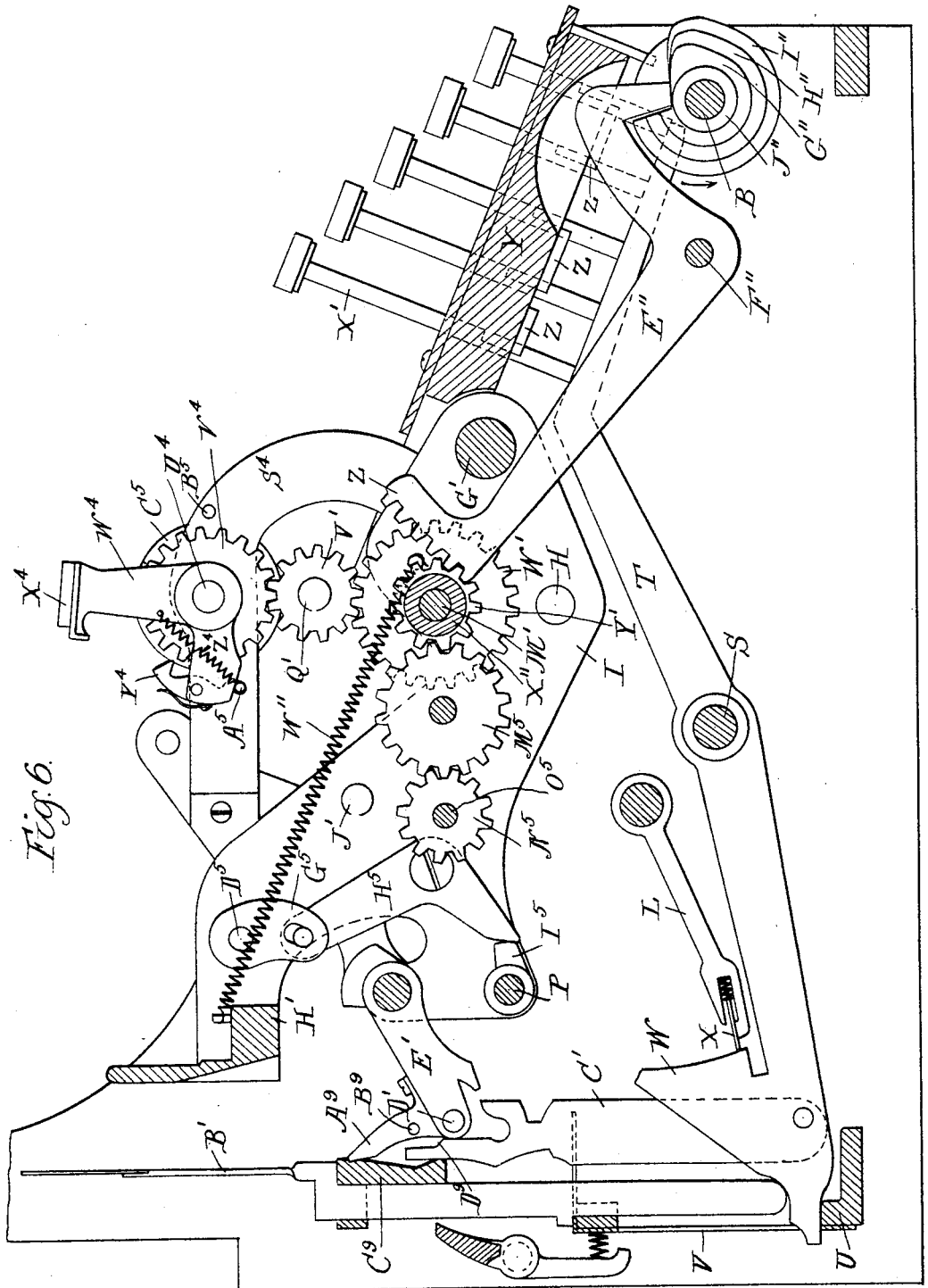
Figure 7:
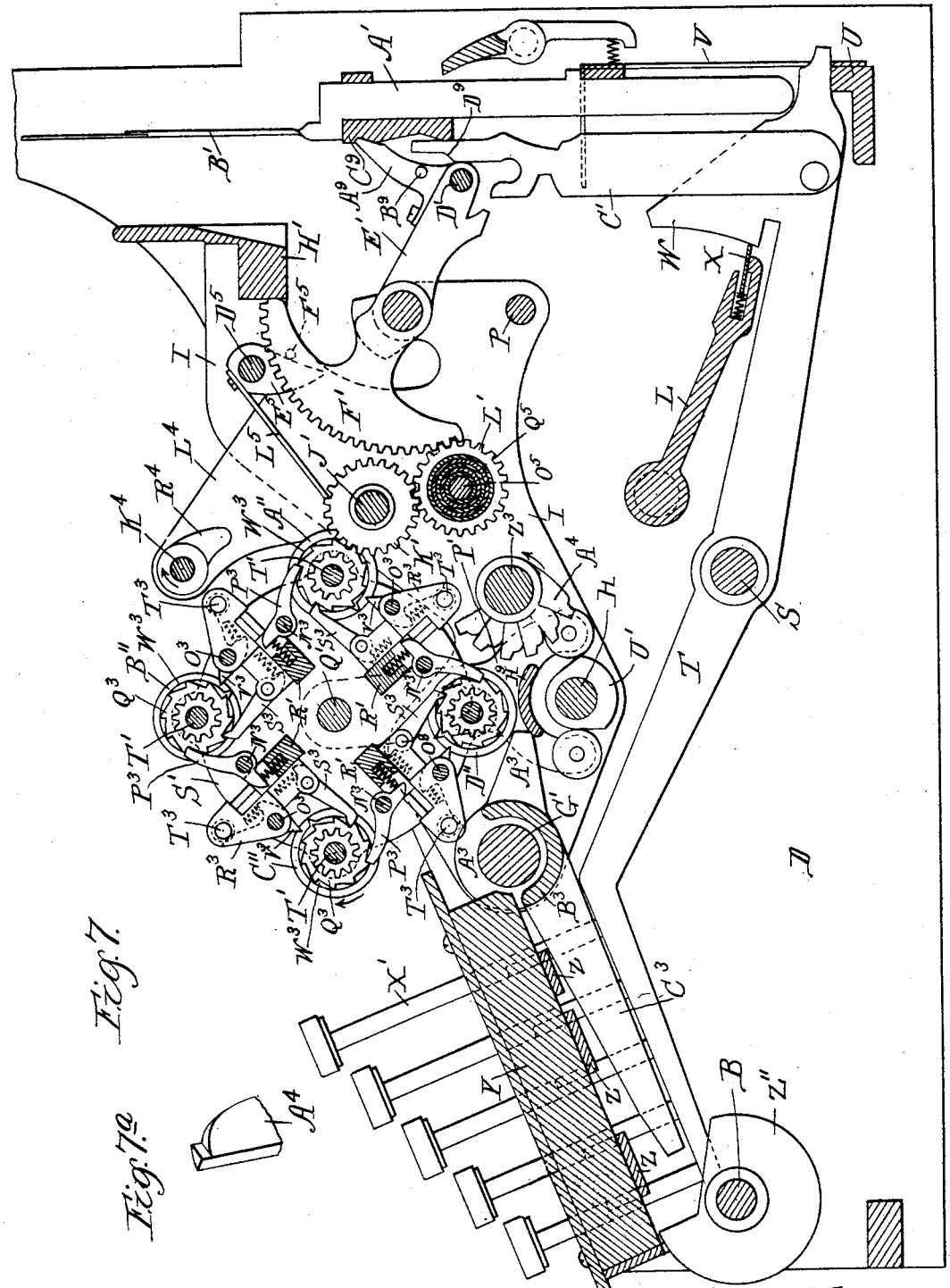
Figure 8:
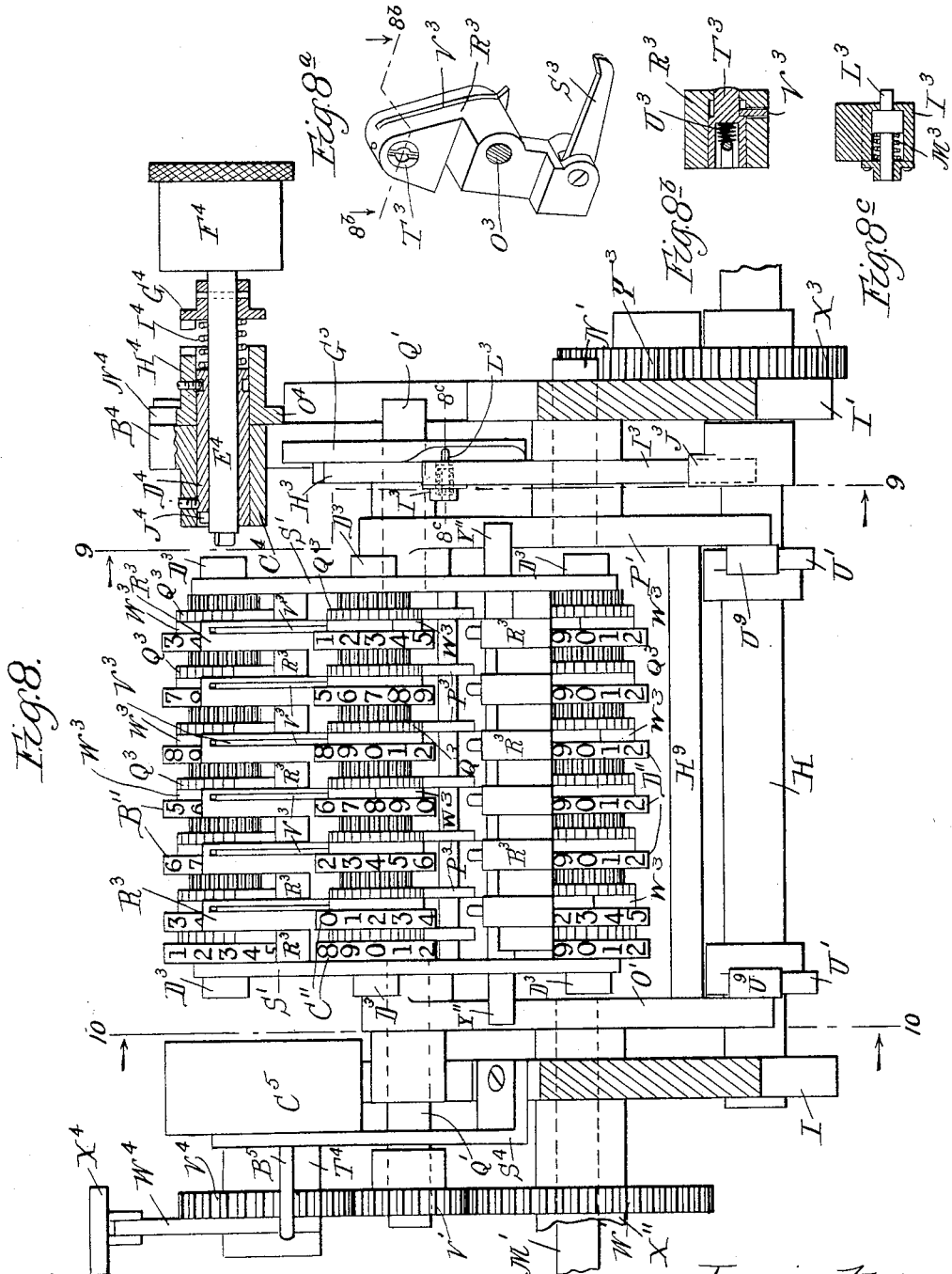
Figure 9:
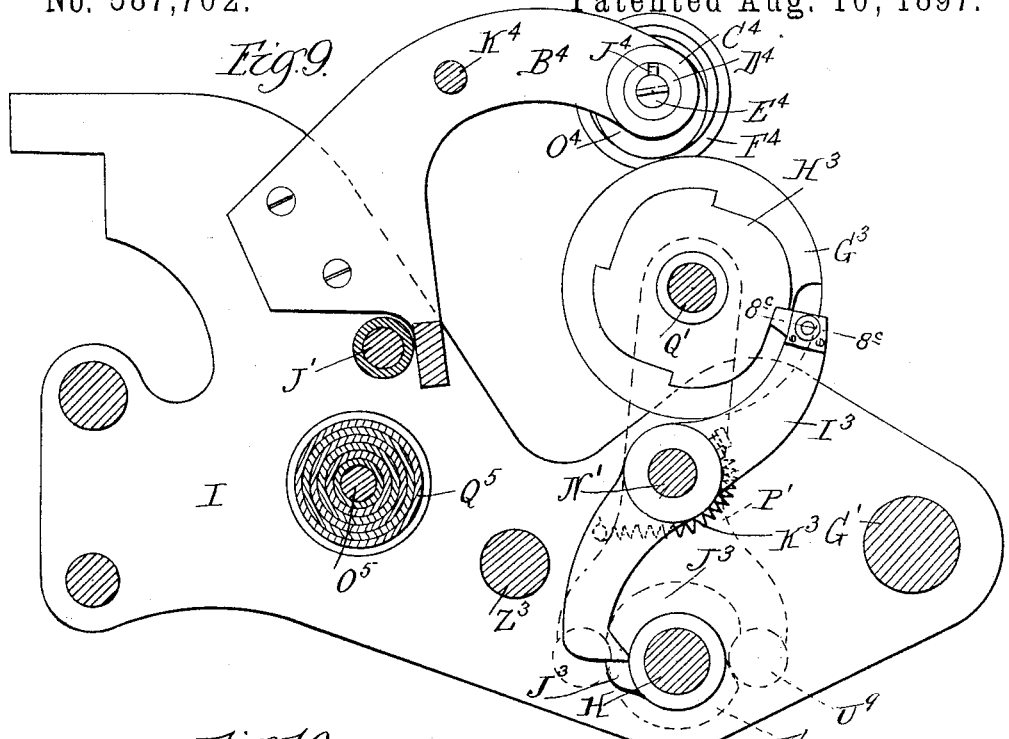
Figure 10:
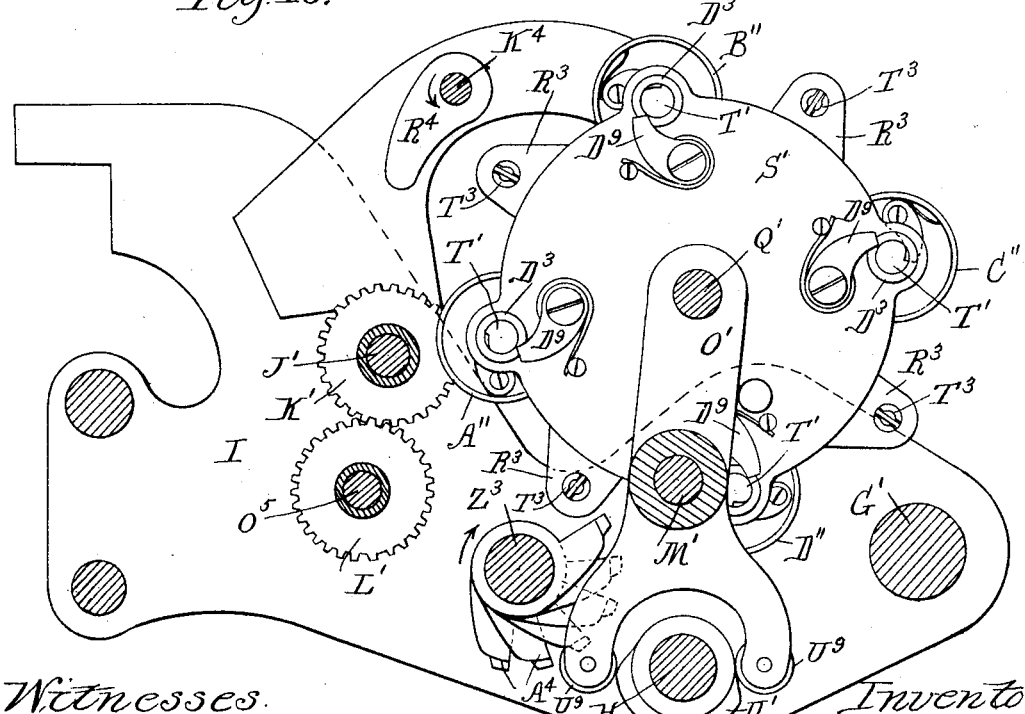

Referring now to the accompanying drawings, in which is illustrated one form of machine embodying my invention, Figure 1 is a front elevation of the machine with the casing removed; Fig. 1ª, a detail of the resetting-cam for the shifter-plate; Fig. 2, a top plan view of Fig. 1; Fig. 2ª, a detail of the stem of one of the special keys and its coöperating lever; Fig. 3, an elevation of the right-hand end of the machine; Fig. 4, an enlarged vertical section approximately on the line 4 4 of Fig. 1, looking to the right; Fig. 5, a vertical section on approximately the same line, looking to the left; Fig. 6, a vertical section immediately at the right of the left-hand end plate of the framework approximately on the line 6 6 of Fig. 1; Fig. 7, a vertical section approximately on the line 7 7 of Fig. 1; Fig. 7ª, a detail of one of the cams for actuating the transfer-pawls; Fig. 8, an enlarged detail front elevation of the rotary register-frame and its supports and some of its coöperating devices; Fig. 8ª, a perspective detail of one of the pawl-carriers and pawls of the transfer devices between the registering-wheels; Fig. 8ᵇ, a sectional detail on the line 8ᵇ 8ᵇ of Fig. 8ª; Fig. 8ᶜ, a sectional detail on the line 8ᶜ 8ᶜ of Fig. 8; Figs. 9 and 10, a vertical section approximately on the lines 9 9 and 10 10 of Fig. 8; Fig. 11, a horizontal sectional detail of the printing attachment approximately on the line 11 11 of Fig. 12; Fig. 11ª, an enlarged sectional detail of one of the printing-rolls; Fig. 12, a vertical section through the printing attachment approximately on the line 12 12 of Fig. 11; Figs. 13 and 14, views of the opposite sides of one of the printed checks; Fig. 15, a detail rear elevation of the printing attachment; Fig. 16, a sectional detail from Fig. 15 on the line 16 16 of Fig. 17; Fig. 17, an enlarged sectional detail from Fig. 16 on the line 17 17 of the latter figure, and Fig. 18 a sectional detail on the line 18 18 of Fig. 17.

The same letters of reference are employed to represent corresponding parts in all the views.

The machine illustrated in the drawings resembles in many features of construction a type of machine shown in a number of patents heretofore granted me, beginning with No. 497,860, of May 23, 1893, and ending with No. 562,707, of June 23, 1896, so that such features may be briefly described in this specification.

Power is applied to the driving mechanism of the machine by an operating-handle A, Figs. 1, 2, and 3, which is fast upon the extreme right-hand end of a horizontal shaft B, extending across the machine at its forward side and journaled at its opposite ends in the end or side frames C D of the framework. This shaft B has fast upon it, immediately at the left of the frame-plate C, a large mutilated gear E, Fig. 4, which coöperates with a second gear F, mounted upon the inner face of the frame-plate C. Owing to the mutilation of the gear E it turns the gear F during only a part of its revolution, permitting the gear F to remain at rest at each operation until the operating-handle and gear E have made about a third of a revolution. During the time the mutilated portion of the gear E is passing the gear F the latter is locked from movement by a lever E⁹, interposed between a toothed disk F⁹, fast upon the gear F, and a cam G⁹, fast upon the gear E, Fig. 4. The gear F meshes with a gear G, Figs. 2 and 4, which is fast upon a rotary shaft H, which extends through and projects to the right beyond the frame-plate C, Fig. 1, and extends in the opposite direction to the left nearly across the machine and is supported at its extreme left-hand end in the plate I of the framework, Figs. 2, 5, 6, and 7. The gear G is sufficiently smaller than the gears F and E to cause the partial revolution given the gear F by the mutilated gear E at each revolution of the operating-handle and shaft B to turn the gear G and shaft H one complete revolution. The shaft H has fast upon it, beside the gear G, a cam J, Figs. 2 and 4, which coöperates with a roller carried by the front end of an arm K, formed integral with and projecting forward from a movable frame L, which is hung at its opposite forward corners to the side frames C D, while its rear edge is adapted to move upward and downward in the arc of a circle under the action of the cam J upon the front end of the arm K. The gear G meshes with a pinion M, which in turn meshes with a pinion N, both mounted upon the inner face of the end plate C, while the pinion N meshes with a gear O, fast upon a rotary shaft P, which extends entirely across the machine, being journaled at its left-hand end in the end plate D and at its right-hand end extending through and projecting beyond the end plate C. The gears O and G are of the same size and the pinions M and N of the same size, so that the gear O and shaft P are given a complete revolution at each revolution of the operating-handle. The shaft P has fast upon it a cam Q, which coöperates with the rear end of an arm R, Figs. 2 and 4, which is loosely hung at its forward end upon the shaft H and at its rear end rests upon an antifriction-roller mounted upon the upper side of the frame L. The shape of the cam Q upon the shaft P is such that it will constantly bear upon the upper end of the arm R during the upward and downward movements of the frame L, with the result that said frame is not only given a positive upward movement by the action of the cam J at each operation of the machine, but a positive downward movement by the action of the cam Q.

Fulcrumed upon a horizontal rod S, extending across the lower middle portion of the machine, and supported at its opposite ends in the frame-plates C D, are the key-levers T, whose rear ends rest upon the cross-piece U of the framework in the lower ends of vertical slots in the guide-plate V, and which are provided with the slotted lugs or hooks W, which coöperate with the spring-pressed plates X, carried by the rear edge of the frame L in the manner described in my aforesaid patents. The shapes of the cams J and Q, which operate the frame L, are such that at the end of each operation of the machine the frame L is supported in the position shown in the drawings, slightly above the rear edges of the key-levers T, being raised to this position just at the end of each operation of the machine after it has reached its lowest limit of movement. The key-levers T are "set" or connected to the frame L by slightly depressing their front ends, which will cause the hooks W of their rear ends to catch over the spring-pressed plates X, so that upon slightly depressing the front end of any lever T and then giving the operating-handle a complete revolution the rear end of such lever will be carried upward with the frame L to its limit of movement, and be then lowered to normal position and become disconnected from the frame, while the latter will then rise slightly to the position shown in the drawings. As shown and described in the last of my aforesaid patents, the front ends of the key-levers T are depressed, to thus connect their rear ends with the driving mechanism, by the setting-keys X', consisting of straight rods or stems passed through holes in the inclined front plate Y of the framework and provided with recesses in their sides, (dotted lines, Figs. 4, 5, 6, and 7,) engaged by transverse plates Z, secured to the under side of the frame-plate Y, which plates Z serve to limit the movements of the keys X'. The upper ends of the key-stems have secured to them numbered finger-buttons representing the values of the respective keys. In the machine illustrated in the drawings there are fifty-four key-levers T, and consequently fifty-four setting-keys X', the latter being arranged in six groups of nine keys each, as shown in Fig. 2, the keys of the right-hand group representing units of cents, those of the next tens of cents, the next units of dollars, the next tens of dollars, the next hundreds of dollars, and the last thousands of dollars, so that the machine has a capacity for any transaction from one cent to nine thousand nine hundred and ninety-nine dollars and ninety-nine cents.

Resting upon the rear ends of the key-levers T are the usual vertical indicator-rods A', carrying at their upper ends the numbered indicators B', which latter are likewise arranged in six groups of nine each, the indicators of each group being located one behind another, as seen in Fig. 2.

Pivoted to the sides of the key-levers T, near their rear ends, are graduated lifter-plates C', which coöperate at their upper ends with the rods D' of the rocking registering-frames E', which carry the segments F', in the manner described in my aforesaid patents. There are six of these rocking registering-frames, one for the nine lifters C' of each group of keys, and the nine lifters of each group are so graduated that each lifter will move its registering-frame a distance proportionate to the value of the key and key-lever corresponding to such lifter.

Each registering-frame E' is provided with a pivoted locking-frame mounted on its rod D', such locking-frame consisting of two upwardly and rearwardly extending side arms $A^9$, rigidly connected by a cross-rod $B^9$. The upper ends of the arms $A^9$ normally engage a shoulder formed on the front side of the transverse bar $C^9$ of the framework and extending longitudinally thereof from side to side of the machine. When any lifter-plate C' rises, a shoulder $D^9$ upon its forward edge, near its upper end, will contact with the rod $B^9$ of the locking-frame $A^9$ belonging to such set of lifters and press the locking-frame forward and disengage it from the bar $C^9$, and thereby release the registering-frame.

So much of the machine as has been thus far described is, with exceptions unnecessary to note, substantially the same as the machine shown and described in the last of my aforesaid patents, and it will be next in order to describe the plurality of registers and the means for supporting them and bringing any one or another of them at will into position to be actuated by the segments F'.

Located a short distance from either side of the middle of the machine are two frame-plates I and I', Figs. 1, 2, 5, 6, 7, and 8, which are supported at their lower forward ends upon a transverse rod G', secured at its opposite ends in the frame-plates C D, while at their upper rear ends the plates I I' are secured to and supported by the cross-bar H' of the framework. Supported at its opposite ends in the plates I I' is a rod J', upon which are mounted a series of pinions K', Figs. 2 and 7, which are geared by a series of intermediate pinions L', hereinafter more fully described, to the segments F', so that the pinions K' partake of all the movements of said segments.

Extending from the frame-plate D to the frame-plate I is a rod or shaft M', (within the sleeve X'', Fig. 2,) which is journaled at its opposite ends in said plates and at its right-hand end projects a short distance to the right of the plate I, Figs. 7, 8, and 10. In line with this rod or shaft M', at the right of the space between the frame-plates I and I', is a short rod or shaft N', Figs. 5, 8, and 9, firmly secured in the plate I' and projecting a short distance to the left therefrom into the open space between the plates I and I'. Pivotally supported upon the projecting ends of these two rods M' N' are two similar vertically-disposed levers O' P', Figs. 5, 7, 8, 9, and 10, whose lower ends (rigidly connected by a cross-bar $H^9$) are forked and straddle the shaft H heretofore described, while their upper ends have journaled in them a transverse shaft Q', which projects at its opposite ends some distance beyond said levers, Fig. 8. Secured upon this shaft Q' between the upper ends of the levers O' P' is the register-supporting frame, composed of two end plates or disks S' and cross-bars and rods connecting them. Journaled at their opposite ends in the end plates R' S' of this rotary frame are four shafts T", Fig. 7, upon which are severally mounted four separate registers or trains of registering-wheels A" B" C" D". Each register in the present instance contains seven registering-wheels, the six right-hand-end ones of which have pinions upon their hubs, which pinions are adapted to cooperate with the pinions K', geared to the segments F', in the manner hereinafter described.

As seen in Fig. 7, the rotary register-frame normally rests in such position that the register A" is immediately adjacent the pinions K', so that if the frame be thrown slightly rearward without turning it upon its axis the pinions of the register A" will be brought into mesh with the pinions K', while if the rotary frame be turned until the register B" or C" or D" is brought to the position normally occupied by the register A" and the frame is then thrown rearward the pinions of such other register will be thrown into mesh with the pinions K'. Now the shaft H, heretofore described, has fast upon it two similar cams U', Figs. 7, 8, 9, and 10, which cooperate, respectively, with rollers U⁹ upon the lower forked ends of the levers O' P' in such manner as to slightly rock such levers at each operation of the machine and throw their upper ends rearward and carry the pinions of the register which is standing opposite the pinions K' into mesh with the latter pinions.

Where the several registers are employed to register different classes of transactions, as illustrated in the drawings, the register A", which normally stands in position to be thrown into gear with the driving mechanism, will usually be employed for registering the most common class of transactions—as, for instance, cash sales. It being unnecessary to turn the rotary frame to bring this register into position, it will remain at rest at any operation of the machine to register a cash sale until it is thrown rearward into gear with the pinions K'; but when any other class of transactions is to be registered some one of the other registers has to be brought to the position normally occupied by the register A" before the frame is thrown rearward to gear the register to the driving mechanism, and the means for moving the rotary frame to position for the several registers to be thus operated may be next described. Fast upon the left-hand end of the shaft Q', which carries the rotary register-frame, Figs. 1, 6, and 8, is a pinion V', which meshes with a gear W', fast upon the right-hand end of a sleeve X", Figs. 2 and 6, which surrounds the rod or shaft M', extending between the frame-plates D and I and heretofore described. This sleeve has fast upon it near its left-hand end a pinion Y', which meshes with a curved rack Z', formed upon the rear end of a lever E", Fig. 6, which lever is fulcrumed upon a stud F", projecting from the inner face of the frame-plate D. The front end of said lever is curved upwardly over the rotary shaft B, to whose extreme right-hand end the operating-handle A is secured, as heretofore described. The extreme forward end of the lever is bent downwardly and suitably shaped to cooperate with a series of cams G" H" I", Figs. 1 and 6, secured to or formed integral with a sleeve or hub J", which is splined upon the shaft B, so as to turn therewith, but is free to be slid longitudinally thereof. It will be seen that if the cams are slid to the left until the cam G" is brought beneath the front end of the lever E" and the shaft B is then revolved the front end of said lever will be forced upward a given distance by the cam G" and the rack Z' upon its rear end be caused to turn the sleeve X", and as the rotary shaft Q', which carries the register-frame, is geared to this sleeve in the manner above explained the rotary frame will be turned a corresponding distance. Now the sizes of the several cams are such that the cam G" will move the lever E" just far enough to cause the rotary frame to carry the register B" into the position normally occupied by the register A", while the cam H" will move it far enough to cause the register C" to be carried to such position, and the cam I" will cause the register D" to be carried to such position. By providing means, therefore, for shifting one or the other of the cams into position to actuate the lever E" the rotary register-frame will be turned by the operation of the driving mechanism to bring the corresponding register into position to be connected with and actuated by such mechanism. The means provided for so shifting the cams is as follows:

The sleeve or hub J" has formed upon its right-hand end a circumferentially-grooved disk K", Fig. 1, in which fits a projection upon the left-hand end of a sliding shifter-plate L", which is secured to the lower forward edge of the frame-plate Y by screws passing through longitudinal slots in the plate L" and is pulled to the right by a coiled spring M". Projecting through additional slots in the shifter-plate L" are the lower forward ends of three levers N", O", and P", which are pivoted in diagonal recesses in the plate Y (dotted lines in Fig. 2) between the fifth and sixth and fourth and fifth and second and third banks of keys and which cooperate at their upper rear ends with the lower ends of the three special keys Q", R", and S", respectively, which keys, as shown in Fig. 2, represent "Paid out," "Rec'd on acc't," and "Charge" transactions. As shown in Fig. 2ª, the right-hand side of the stems of the special keys Q", R", and S" are cut away and provided with beveled shoulders, so that when either of said keys is depressed it will force the upper rear end of its cooperating lever N", O", or P" to the right and throw the lower forward end of such lever to the left, carrying the shifter-plate L" in the latter direction. The pivotal arrangement of the levers is such that the depression of the "Charge" key S" will move the shifter-plate L" to the left just far enough to bring the cam G″ into line with the lever E‴, while the depression of the key R″ will give the shifter-plate L″ a greater movement and carry the cam H″ into line with the lever E‴, while the depression of the key Q″ will impart a still greater movement to the shifter-plate L″ and carry the cam I″ into line with the lever E‴. It results from this construction and arrangement of parts that whenever the "Charge" key S″ is depressed and the operating-handle given a revolution the rotary frame carrying the registers will be turned until the register B″ is brought into the position normally occupied by the register A″, Fig. 7, and its pinions then be engaged with the pinions K′ and the amount represented by the cash-keys which have been set be then added upon such register, while the depression of the special key R″ prior to turning the operating-handle will cause the amount of the transaction to be added upon the register C″, and the depression of the key Q″ prior to turning the handle will in like manner cause the amount of the transaction to be added upon the register D″.

As seen in Fig. 2, there is a fourth special key T‴, marked "No sale," at the right of the other three special keys above described. The lower end of each of these four special keys coöperates with a lever T, similar to the levers T of the cash-keys excepting that it carries no lifter-arm C′ and has no coöperation with the registering mechanism. The depression of each special key, however, serves to couple its lever T to the bar L, so that such lever will be carried with the bar and returned by it to normal position, and when so returned said lever will lift its special key to normal position, and in the case of the special keys O″, R″, and S″ will thereby serve to release the shifter-plate L″ and permit its spring M″ to pull it to the right to its normal position. The levers T of the special keys may carry indicator-rods and indicators bearing signs corresponding to those on the special keys, as usual.

For the purpose of positively returning the cams and shifter-plate L″ to the right at the end of each operation and not relying upon the spring M″ for that purpose the disk K″ has secured to its left-hand side a beveled plate U″, Figs. 1 and 1ª, which at the end of revolution of the shaft B and parts carried by it rides over a stud V″, projecting from the under side of the plate Y, and forces the cams and shifter-plate to the right to normal position.

As seen in Fig. 6, the tails of the cams G″ H″ I″ terminate in abrupt shoulders, and when the shoulder of the cam which has operated the lever E″ clears the end of said lever as the shaft B and cams complete their revolution the rotary register-frame will be free to return to normal position and is returned to such position by a coiled spring W″, Fig. 6, which is connected at its forward end to the gear W′, which meshes with the pinion V′, fast upon the shaft Q′, which carries the rotary register-frame, said spring being connected at its rear end to the cross-bar H′ of the framework. Studs Y″, projecting outwardly from the side plates S′ of the rotary register-frame, Fig. 8, rest against the forward sides of the levers O′ P′ when said rotary frame is in normal position, and the contact of these studs with said levers serves to arrest the frame and limit its movement under the action of the resetting-spring W″.

For the purpose of positively arresting the rotary frame when it is turned rearward by the action of the cams G″ H″ I″ and preventing it being thrown too far there are provided the following stop devices: Mounted upon the rod G′, between the frame-plates I and I′, Figs. 2 and 7, is a rocking frame composed of two side arms A³, Fig. 2, hung upon and projecting rearwardly from the rod G′, a curved cross-bar B³ beneath the rod G′ rigidly connecting said two side arms, Fig. 7, and an arm C³, formed integral with the cross-bar B³ near its middle and projecting downwardly and forwardly from the same. A suitable spring (not shown) yieldingly holds the frame in normal position, with the rear ends of its arms A³ resting upon the cross-bar H⁹, which connects the levers O′ P′, Fig. 7. The lower forward end of the arm C³ of this stop-frame coöperates with a cam Z″ upon the rotary shaft B, which carries the operating-handle. The rear ends of the arms A³ coöperate with projections D³ upon the side plates S′ of the rotary register-frame, said projections in the present instance consisting of collars secured upon the projecting ends of the shafts T′, upon which the registering-wheels are mounted, there being, therefore, one projection upon each end of the rotary frame in line with the axis of each train of registering-wheels. When the operating-handle is turned forward from normal position, the cam Z″ will at the proper time contact with the front end of the arm C³ and depress it and throw the rear ends of the stop-arms A³ upward into the path of the projections D³ upon the rotary registering-frame to arrest the latter. Now the cams G″ H″ I″, which rotate said frame, are of such shape that they all act upon the lever E″ to rotate the frame during substantially the same portion of their revolutions, so that when the cam G″ acts upon said lever the rotary frame will be turned comparatively slowly, while when the cam H″ acts upon the lever it will be turned faster, and when the cam I″ acts upon the lever it will be turned still faster, so that no matter which cam is in action the rotary register-frame will be turned to bring the proper register into registering position by the time the operating-handle has completed a given portion of its revolution. This rotation of the registering-frame by the action of the cams is completed, no matter which cam is in action, just before the cam Z″ contacts with and depresses the arm C³ of the stop-frame above described, so that the stop-arms A³ are thrown upward at the proper time to contact with the proper projections $D^3$ upon the rotary frame. If the cam $G''$ is the one set for action, the cam $Z''$ will throw the stop-arms $A^3$ upward in time to contact with the projections $D^3$, corresponding to the register $A''$, Fig. 7, and thereby arrest the frame with the register $B''$ in registering position—to wit, the position normally occupied by the register $A''$. If the cam $H''$ is set for action, the projections $D^3$, corresponding to the register $B''$, will be the ones which will contact with the stop-arms $A^3$, thereby arresting the frame with the register $C''$ in registering position, while if the cam $I''$ be the one set for action the projections $D^3$, corresponding to the register $C''$, will be the ones engaged by the stop-arms $A^3$ and the frame be arrested with the register $D''$ in registering position.

It will be understood that in the manner and by the means above described when either one of the special keys is set and the operating-handle given a revolution the register-frame will be positively arrested by the stop-arms $A^3$ in position for the register corresponding to such special key to be thrown into gear with the driving mechanism and that all possibility of the registering-frame being thrown too far by any rapid revolution of the operating-handle is removed.

For the purpose of locking the register-frame in each of its adjusted positions against backward movement the rotary shaft $Q'$, which carries the register-frame, has secured upon its right-hand end a disk $G^3$, Fig. 5, which has fast upon its left-hand side, Fig. 9, a smaller disk $H^3$, provided with four equidistant shoulders, with which coöperates the upper forward end of a pawl $I^3$, which is fulcrumed upon the rod $N'$ and coöperates at its lower rear end with a cam $J^3$, fast upon the rotary shaft $H$. A coiled spring $K^3$, connected to said pawl, presses its upper forward end against the periphery of the disk $H^3$. In the normal position of the parts the pawl $I^3$ is engaged with one of said shoulders, as in Fig. 9. When the rotary register-frame is given a quarter-revolution by the action of the cam $G''$, the pawl $I^3$ will engage the next shoulder on the disk $H^3$ and hold the frame from backward movement until disengaged from said shoulder. When the register-frame is given a half-revolution by the action of the cam $H''$, the pawl will engage the second shoulder and hold the frame in that position, and when the frame is given a three-quarter revolution by the action of the cam $J''$ the pawl will engage the third shoulder on the disk $H^3$ and hold the frame in that position. Just at the end of each operation of the machine the cam $J^3$ will ride under and lift the lower rear end of the pawl $I^3$ and disengage its upper forward end from the shoulder on the disk $H^3$ to permit the latter and the rotary register-frame to be returned to normal position by the action of the resetting-spring. For the purpose of holding the pawl $I^3$ out of engagement with the disk $H^3$ during such return movement of the disk and register-frame and preventing it engaging any of the shoulders on said disk until the latter and the frame reach normal position the pawl is provided near its upper end with a transverse bore and housing, in which fits a pin $L^3$, Fig. 8$^c$, pressed toward the right by a coiled spring $M^3$, confined in said housing.

When the pawl $I^3$ is engaged with a shoulder on the disk $H^3$, as in Fig. 9, the pin $L^3$ stands within the peripheral line of the disk $G^3$; but when the upper end of the pawl is thrown forward and disengaged from the disk $H^3$ the pin $L^3$ will be carried beyond the peripheral line of the disk $G^3$. The left side of the disk $G^3$ is cut away at the point which normally stands opposite the pin $L^3$, so that the spring $M^3$ can press the pin to the right into the plane of the body of the disk, Fig. 8. When, however, the disk is turned from normal position by rotation of the registering-frame, such cut-away space will be carried away from the pin and the latter will be forced to the left into its housing by the body of the disk, and during the further revolution of the latter will bear against the left-hand side of the disk near its periphery, the spring $M^3$ pressing it against the disk. Now with the pin so pressing against the disk when the upper end of the pawl $I^3$ is thrown forward by the action of the cam $J^3$ at the end of an operation of the machine, and the pin $L^3$ thereby carried beyond the peripheral line of the disk $G^3$, the spring $M^3$ will force the pin $L^3$ to the right into the plane of the disk and beyond its periphery, so that when the cam $J^3$ clears the lower end of the pawl $I^3$ and the resetting-spring for the latter presses it toward normal position the projecting end of the pin $L^3$ will contact with the periphery of the disk $G^3$ and prevent return movement of the pawl and reëngagement of it with the disk $H^3$. This engagement of the pin with the periphery of the disk $G^3$ will serve to hold the pawl $I^3$ out of action until the register-frame and disk reach normal position, whereupon the cut-away portion of the disk $G^3$ will be again brought opposite the pin $L^3$, so that the latter will escape from the periphery of the disk and the upper end of the pawl $I^3$ be again thrown rearward by its spring $K^3$ into engagement with the disk $H^3$.

The side plates $S'\,S'$ of the rotary register-frame, in addition to being connected by the shafts $T'$, which carry the registering-wheels, and by the cross-bars $R'$, Fig. 7, are also connected by a series of rods $N^3$ and a second series of rods $O^3$, there being four of such rods in each series. Upon the rods $N^3$ are mounted a series of spring-pressed holding-pawls $P^3$, which engage ratchets $Q^3$, fast upon the hubs of the respective registering-wheels, to prevent backward movement of the latter. Mounted upon the rods $O^3$ are a series of pawl-carrying levers $R^3$ of the shape best shown in Fig. 8$^a$. Pivoted in each of these levers at one end of it is a spring-pressed transfer-pawl $S^3$, engaging the ratchet $Q^3$ of the registering-wheel immediately at the left of the lever. Within a bore or housing in the opposite end of the lever is confined a transverse pin $T^3$, which is normally pressed toward the right by a spring $U^3$, Fig. $8^b$, which tends to project the right-hand end of the pin from the bore or housing in the lever $R^3$. Fitting in a longitudinal slot in each lever $R^3$ is a latch-lever $V^3$, which is fulcrumed upon the same rod $O^3$ as the lever itself and the outer end of whose longer arm normally engages a shoulder on the sliding pin $T^3$, Fig. $8^b$, and prevents the spring $U^3$ projecting said pin from its housing. The opposite end of the latch-lever $V^3$ projects into the path of a tooth upon the periphery of a disk $W^3$, fast upon the hub of the registering-wheel on the right, Figs. 7 and 8. It will be understood that there is one of the pawl-carrying levers $R^3$ and transfer-pawls $S^3$ intermediate each two wheels in each series, and that while the transfer-pawl $S^3$ of any given lever engages the ratchet $Q^3$ upon one registering-wheel in the series the short arm of the latch-lever $V^3$, carried by such lever $R^3$, will stand in the path of the projection or tooth upon the disk $Q^3$ of the next lower wheel in the series immediately at the right of the first-mentioned wheel. At each complete revolution of such lower wheel the projection upon the disk $Q^3$ will contact with the short arm of the latch-lever $V^3$ and rock it upon its fulcrum $O^3$ and disengage the extremity of its long arm from the shoulder on the pin $T^3$, confined in the lever $R^3$, Figs. $8^a$ and $8^b$, and thereby permit the spring $U^3$ to project said pin to the right out of its housing.

Now there is secured upon the rotary shaft H, immediately at the right of the frame-plate I′, Fig. 5, a pinion $X^3$, which meshes with a similar pinion $Y^3$, fast upon the end of a shaft $Z^3$, which extends between the frames I and I′ and is journaled at its opposite ends therein. Fast upon this shaft $Z^3$, which is given a complete revolution at each operation of the machine, is a series of cams $A^4$, Figs. 7 and 10. These cams are arranged spirally around the shaft $Z^3$ and at such distances from each other longitudinally of the shaft and in such positions that when the shaft is revolved they will severally pass between the outer ends of the respective pawl-carrying levers $R^3$ which at the time stand immediately above the shaft $Z^3$ in the position of the ones belonging to the register A″ in Figs. 7 and 10. When the pins $T^3$, confined in the housings in the outer ends of the levers $R^3$, are in their normal positions within said housings, the cams $A^4$ will pass freely between the outer ends of said levers and the latter remain unmoved by them. When, however, the pin $T^3$ in any lever is released by disengagement of its latch-lever $V^3$ from it in the manner above described, its spring $U^3$ will project it outward into the path of travel of the corresponding cam $A^4$, so that when the cams are then revolved such cam $A^4$ will contact with the pin and rock the lever $R^3$ upon its fulcrum $O^3$ and force the transfer-pawl $S^3$, carried by its inner end, upward and rearward in Fig. 7, and thereby turn the ratchet of the next higher registering-wheel in the series forward one notch and add a unit upon such higher wheel. The extreme outer ends of the cams $A^4$ are beveled off upon their left-hand sides, as shown in Figs. $7^a$ and 10, so that just as they clear the pins $T^3$, after having rocked the levers $R^3$ and actuated the pawls $S^3$ to effect the transfers, their beveled sides will act upon the ends of the pins $T^3$ and press the latter to the left again into their housings, whereupon they will be reëngaged by the latch-levers $V^3$ and held in normal position until again released in the manner described. There are six of the cams $A^4$ upon the shaft $Z^3$, one to coöperate with each of the six pawl-carrying levers $R^3$, and owing to their spiral arrangement around the shaft $Z^3$ they will act successively from right to left upon any levers $T^3$ which have been set for transfer, so that the transfers will be effected successively from the lower to the higher wheels and none of them lost.

It will be understood from the foregoing description that in the manner and by the means explained at each complete revolution of any registering-wheel in either of the four sets the tooth upon its disk $W^3$ will contact with the latch-lever $V^3$ of the pawl-carrying lever $R^3$ intermediate such wheel and the next higher wheel in the series and release the pin $T^3$, carried by such lever $R^3$, and permit its spring $U^3$ to project it laterally from the lever, and that when the shaft $Z^3$ is then revolved one of the cams $A^4$ upon such shaft will contact with such projecting pin $T^3$ and rock the lever $R^3$ and cause its pawl $S^3$ to advance the next higher registering-wheel one number, and that after the cam has so rocked the lever $R^3$ it will act upon the pin $T^3$ and force it back into its housing, where it will be reengaged by its latch-lever $V^3$ and held by the former in normal position. It will be understood that these transfer devices for the several sets of registering-wheels are duplicates of each other and that when the rotary registering-frame is turned to bring any one of the registers into registering position the transfer devices for such register will be brought with it into the same position relatively to the cams $A^4$ upon the shaft $Z^3$ as that occupied by the transfer devices of the register A″ in Figs. 7 and 10 of the drawings. It will also be understood that the action of the cam U′ upon the shaft H rocks the levers O′ P′ in one direction and carries the rotary registering-frame rearward and engages the pinions of the register with the driving-pinions K′, and holds the parts in this position while the registering movements of the segments F′ are imparted to the registering-wheels, and then rocks the levers back to normal position and carries the rotary register-frame forward and disengages the pinions of the register from the driving-pinions K' before the cams A¹ upon the shaft Z³ contact with any of the released pins T³ of the pawl-carrying levers, but that said cams act upon such pins while the rotary frame is held in the position to which it has been moved by the cam upon the shaft B, with the desired register in registering position, and that at the end of the operation, after the cams A⁴ have all passed forward beyond the transverse line of the pins T³, the rotary frame is released and returned to normal position by its resetting-spring in the manner heretofore described. Owing to the mutilation of the gear E upon the shaft B, Fig. 4, by which the gear F and parts driven by it are allowed to remain at rest until the operating-handle and shaft B have been given about one-third of a revolution, it follows that the cams G'' H'' I''' upon the shaft B will actuate the lever E''', Fig. 6, and rotate the register-frame to bring the desired register into registering position before the cam U', Fig. 7, is turned from normal position to rock the levers O' P' and throw the register-frame rearward to engage the pinions of the set register with the driving mechanism.

Interposed between each of the shafts T' and the registering-wheels mounted thereon are the usual or any suitable devices for causing the shaft to pick up the registering-wheels and carry them with it when the shaft is turned in one direction, and the following devices are provided for turning the respective shafts to reset the registering-wheels to zero: Secured to the frame-plate I', Figs. 5, 8, and 9, is an upwardly and forwardly curved arm B⁴, whose forward end is formed into a laterally-extended cylindrical bearing C⁴, Figs. 1, 2, and 8, in which is fixed a bushing D⁴, Figs. 8 and 9. Extending through this bushing and projecting some distance to the right thereof is a rod E⁴, Figs. 1, 2, and 8, which rod has fast upon its right-hand end a milled thumb-piece F⁴, by which it may be turned. Fast upon the rod at the left of this thumb-piece is a clutch-collar G⁴, which coöperates with a sleeve H⁴, mounted to turn upon the bushing D⁴, which projects to the right of the bearing C⁴, Fig. 8. Surrounding the rod E⁴ and confined between the collar G⁴ and the right-hand end of the bushing D⁴ is a coiled spring I⁴, whose left-hand end fits within the right-hand end of the sleeve H⁴ and bears against the end of the bushing D⁴. The shaft E⁴ is so located that when the rotary register-frame is in either of its four registering positions the shaft T' of the register which is uppermost at such time will stand in line with the shaft E⁴, and each of the shafts T' is provided in its right-hand end with a nick adapted to receive the left-hand end of the rod E⁴ when the latter is forced to the left against the resistance of its spring I⁴, the left-hand end of the rod E⁴ being suitably adapted to engage the nicks in the ends of the shafts T'.

As seen in Figs. 8 and 9, the rod E⁴ is provided near its left-hand end with a projecting lug J⁴, which fits in a short recess or slot cut in the bushing D⁴, the engagement of which lug with the right-hand end of such slot limits the movement of the rod E⁴ to the right under the stress of the spring I⁴. When the rod E⁴ is forced to the left and engaged with the shaft T' of the uppermost register and is then turned in the direction of the arrow in Fig. 2, the lug J⁴ will be carried away from the recess in the bushing D⁴, and its engagement with the left-hand end of such bushing will serve to lock the shaft E⁴ in left-hand position and prevent movement of it to the right until it has been given a complete revolution and the lug again brought opposite the recess. When, therefore, the rod E⁴ is slid to the left and turned, by means of the thumb-piece F⁴, until the lug J⁴ again comes opposite the recess in the bushing D⁴ and the spring I⁴ then throws the rod to the right again, the shaft T' of the uppermost register will be given a complete revolution, and the wheels of such register be thereby returned to zero or initial position. Spring-pressed pawls D⁹, Fig. 10, engage notches in the collars D⁸ upon the left-hand ends of the shafts T' when the latter are in normal position and yieldingly hold them from movement.

For the purpose of preventing the resetting of the wheels of any register while any of the pins T³ of the transfer devices of such register are projected from their housings the following devices are provided: Journaled at its right-hand end in the arm B⁴ of the frame-plate I', Figs. 5, 9, and 10, is a rock-shaft K⁴, whose left-hand end is journaled in an arm L⁴, carried by the frame-plate I', Fig. 7. At its right-hand end this rock-shaft K⁴ has fast upon it an arm M⁴, Fig. 5, whose outer end is slotted to receive a stud upon the rear end of a lever N⁴, whose forward end rests upon the periphery of a cam O⁴, formed upon the left-hand end of the sleeve H⁴, heretofore described, Figs. 1, 2, 5, and 8. A coiled spring P⁴, surrounding the rock-shaft K⁴ near its left-hand end, Fig. 2, and secured at one end to the arm L⁴ of the frame-plate and at its opposite end to a collar Q⁴, fast upon the shaft K⁴, yieldingly holds said shaft in normal position and presses the forward end of the lever against the periphery of the cam O⁴, Fig. 5. Fast upon the rock-shaft K⁴ are a series of arms R⁴, Figs. 2, 7, and 10. When the rod E⁴ of the resetting devices is forced to the left, its clutch-collar G⁴ will engage the clutch end of the sleeve H⁴, which carries the cam O⁴, and when the rod E⁴ is then turned to reset the registering-wheels the cam O⁴ will be turned with it. As the cam turns in the direction of the arrow in Fig. 5 it will ride under the forward end of the lever N⁴ and gradually raise it and depress its rear end, which will serve to rock the shaft K⁴ in the direction of the arrow in Figs. 5 and 10 and throw forward the lower end of the arms R⁴, carried by said shaft. When these arms R⁴ are thus thrown forward, they pass between the outer ends of the pawl-carrying levers R³, belonging to the uppermost register, provided all of the pins T³ of the levers R³ of such register are in normal position within their housings; but if any one of such pins is projecting from its housing it will be struck by one of the arms R⁴ and movement of the arms and rock-shaft and consequently of the resetting devices be arrested, and further movement of them prevented until such pin is forced into its housing again.

Inasmuch as the resetting devices for the registers are located in fixed position and can coöperate only with the uppermost register of the four it follows that when it is desired to reset all of the registers they must be successively brought to uppermost position and held there while the resetting operation takes place. For this purpose there are provided the following devices: Secured at its opposite ends to the left-hand frame-plate I, Figs. 6 and 8, is a curved frame-plate S⁴, which has secured to it in its upper middle portion a laterally-extended bearing T⁴, Figs. 1 and 8, in which fits a short shaft U⁴, having fast upon it a pinion V⁴, Fig. 6, which meshes with the pinion V', fast upon the rotary shaft Q', which carries the register-frame. Loosely mounted upon the shaft U⁴ at the left of the pinion V⁴, is a bell-crank W⁴, the upper end of whose vertical arm is provided with a finger-piece X⁴ by which said arm may be pulled forward and the rear end of whose lower arm carries a spring-pressed pawl Y⁴, adapted to coöperate with the pinion V⁴. A coiled spring Z⁴, connected at one end to the vertical arm of the bell-crank W⁴ and at its opposite end to a pin A⁵, projecting from the frame-plate S⁴, yieldingly holds the bell-crank in normal position with its horizontal arm resting against said pin. A second pin B⁵, projecting from the plate S⁴ in front of the bell-crank, limits the forward movement of the vertical arm thereof. The lower end of the pawl Y⁴ is shaped to engage the pin A⁵ and be slightly forced forward by the latter when the bell-crank is held in normal position by the spring Z⁴, with the result that in such position the upper end of the pawl Y⁴ is disengaged from the pinion V⁴, as in Fig. 6. When, however, the bell-crank W⁴ is pulled forward, the pawl Y⁴ will be thrown into engagement with the pinion V⁴ as soon as the lower end of the pawl is moved away from the pin A⁵, with the result that the pinion V⁴ will be carried forward with the bell-crank until the latter is arrested by contact with the stop-pin B⁵. Now the limit of movement of the bell-crank W⁴ and the adjustment of the parts are such that when the bell-crank is pulled forward from normal position until arrested by the stop-pin B⁵ the rotary register-frame will be turned just one-quarter of a revolution. With said frame in the normal position shown in Figs. 7 and 10, therefore, one forward movement of the bell-crank W⁴ will turn said frame just far enough to bring the register B″ to the registering position normally occupied by the register A″, and thereby bring the register C″ into the uppermost position normally occupied by the register B″, so that the register C″ will then be in position to be reset by the resetting devices. When the register-frame has been given a quarter-revolution in this manner, it will be caught and held in such position by the engagement of the pawl I³, Fig. 9, with the disk H³, as heretofore explained, while the bell-crank W⁴ may be released and be returned to normal position by its spring Z⁴, its pawl Y⁴ slipping idly backward over the teeth of the pinion V⁴ until disengaged therefrom by contact of its lower end with the pin A⁵ as the bell-crank reaches normal position. A second forward movement of the bell-crank will turn the rotary register-frame another quarter-revolution and bring the register D″ into uppermost position ready to be reset by the resetting devices, while a third forward movement of the bell-crank will give the frame another quarter-revolution and bring the register A″ to uppermost position. In order, therefore, to reset all of the registers, it is only necessary, starting with the registers in the normal position shown in Figs. 7 and 10, to press the thumb-piece F⁴ to the left and give it a revolution to reset the register B″. Then pull the bell-crank W⁴ forward to its limit of movement and release it, and then press the thumb-piece F⁴ to the left again and give it another revolution to reset the register C″. Then pull the bell-crank W⁴ forward a second time and release it, and then press the thumb-piece to the left again and give it another revolution to reset the register D″, and then pull the bell-crank forward a third time and release it and press the thumb-piece to the left and turn it again to reset the register A″, after which, by giving the operating-handle a revolution, the pawl I³ will be disengaged from the disk H³ by the action of the cam J³ upon the shaft H, Fig. 9, and the resetting-spring W″, Fig. 6, be permitted to return the rotary register-frame to normal position in the manner heretofore explained.

Fast upon the shaft U⁴ at the right of the frame-plate S⁴ is an indicator-wheel C⁵, Figs. 1, 2 and 6, provided upon its periphery with four signs representing the several kinds of transactions which are to be registered upon the four registers. These signs are so arranged upon the indicator-wheel C⁵ that the one which is uppermost upon said wheel at any given time will correspond to the register which is uppermost and in line with such sign at such time. Thus in Fig. 2 the word "Charge" is uppermost on the wheel C⁵, while the register B″, which is uppermost in said view, is the one upon which the charge or credit transactions are registered. When the register-frame is turned rearward until the register C″ is brought to uppermost position, the indicator-wheel C⁵ will be simultaneously turned forward to bring the sign "Rec'd on acc't" to uppermost position, indicating that "Rec'd on acc't" transactions are registered upon the register C″. Likewise, when the register D″ is brought to uppermost position the words "Paid out" upon the indicator C⁵ will be brought to uppermost position on said wheel, while when the register A″ is brought to such position the word "Cash" upon said wheel will be exposed in line with it. The provision of this indicator-wheel C⁵ enables the proprietor when taking the readings from the registers and resetting them to observe at a glance the character of transactions registered upon each register.

For the purpose of insuring the complete return of the segments F′ to normal position at the end of each operation there is provided a rock-shaft D⁵, Figs. 2, 5, 6, and 7, journaled at its opposite ends in the frame-plates I and I′ and projecting at each end slightly beyond said plates. As seen in Fig. 7, this rock-shaft has fast upon it a series of arms E⁵, which coöperate with studs F⁵ upon the sides of the respective segments F′, with the result that when the rock-shaft and arms E⁵ are positively returned to normal position they will force the segments F′ rearward against the cross-bar H′ of the framework and hold them there so long as the rock-shaft and arms are maintained in normal position. As seen in Fig. 6, the rock-shaft has fast upon its left-hand end an arm G⁵, provided near its lower end with a slot in which fits a stud upon the upper end of a lever H⁵, whose lower end coöperates with a cam I⁵, fast upon the rotary shaft P, heretofore described.

As seen in Fig. 5, the rock-shaft D has fast upon its right-hand end a collar J⁵, to which is secured and around which is wound a spring K⁵, whose free end is engaged with the cross-bar H′, which spring tends to turn the rock-shaft in the direction of the arrow in Fig. 5 and throw its arms E⁵ forward and upward away from and out of the path of the studs F⁵ upon the segments F′, Fig. 7. When the cam I⁵, Fig. 6, is carried away from the end of the lever H⁵ at the beginning of rotation of the shaft P, the spring K⁵ is free to act in the manner described, and when the shaft P approaches the end of its rotation the cam I⁵ will contact with the end of the lever H⁵ and force the parts back into normal position, causing the arms E⁵ to bear against the studs F⁵ upon the segments F′ and force the latter against the bar H′ of the framework.

The respective arms E⁵ have secured to their upper sides a series of spring-dogs L⁵, whose lower forward ends in the normal positions of the parts bear upon the pinions K′.

Having now described the registering mechanism of the machine and the means by which the different classes of transactions are registered upon the several registers, I will next describe the printing mechanism and the means by which the amount of each transaction is printed upon a paper strip and also upon a paper ticket or check, as desired, together with a sign or character indicating the class of each transaction.

As seen in Figs. 2 and 6, the pinion Y′, which is fast upon the left-hand end of the sleeve X″, meshes with a pinion M⁵, mounted upon a stub-shaft projecting from the side plate D of the framework, which pinion M⁵ meshes with a pinion N⁵, fast upon a shaft O⁵, which extends transversely across the entire machine and projects through and beyond the right-hand frame-plate C. Fast upon the extreme right-hand end of this shaft O⁵, at the right of the side plate C of the framework, is a type-wheel P⁵, Fig. 11, which bears two diametrically opposite series of type-characters, each representing the respective classes of transactions which are to be registered upon the several registers. Inasmuch as the shaft O⁵ is geared directly to the rotary register-frame through the medium of the pinions N⁵ M⁵ Y′, the sleeve X″, gear W′, and pinion V′, connecting it to the rotary shaft Q′, which carries said register-frame, Fig. 6, it follows that the type-wheel P⁵ will be moved in unison with the register-frame when the latter is turned to bring any one or another of its registers to registering position, and the adjustment of the parts is such that when said frame is turned to bring any given one of its registers into registering position the type-wheel P⁵ will be turned to bring to the printing-points in vertical line above and below its axis the two type-characters representing the class of transaction to which such register is appropriated, with the result that when the printing is effected in the manner hereinafter described, with the type-wheel in such position, a sign or character corresponding to the class of transaction being registered will be printed upon the paper strip and ticket at the opposite sides of the type-wheel.

Loosely mounted upon the shaft O⁵ are six concentric sleeves Q⁵, which extend from points intermediate the two frame-plates I and I′ to the right through and beyond the right-hand side plate C of the framework. The pinions L′, which mesh with the respective segments F′, Fig. 7, are fast upon the left-hand ends of the respective sleeves Q⁵, the pinion L′, which meshes with the extreme left-hand segment, being fast upon the left-hand end of the innermost sleeve Q⁵, the one meshing with the second segment from the left being fast upon the second sleeve, and so on to the one meshing with the right-hand segment, which is fast upon the outermost sleeve Q⁵. Fast upon the right-hand ends of the sleeves Q⁵ are a series of type-wheels R⁵, immediately at the left of the type-wheel P⁵, heretofore described, the right-hand type-wheel R⁵ being fast upon the innermost sleeve, the next upon the second sleeve, and so on to the left-hand type-wheel, which is fast upon the outermost sleeve. The movements of the segments F' are therefore transmitted through the pinions L' and sleeves $Q^5$ to the type-wheels $R^5$. Each type-wheel (except the right-hand one) bears two diametrically opposite series of type-numbers, each series representing a cipher and the nine digits, and the adjustment of the parts is such that when the segments are actuated in the manner heretofore described to register any given amount the proper type-wheels $R^5$ will be turned to bring to the two printing-points their type-numbers representing such amount.

Inasmuch as the rotary register-frame is turned to bring the proper register into registering position during the first portion of the revolution of the operating-handle, before the devices for actuating such register are operated, it follows that the type-wheel $P^5$ will be brought to proper printing position at the beginning of each operation of the machine and will be held there while the other type-wheels are set simultaneously with the operation of the registering devices. The shape of the cam J, which operates the frame L to lift the rear ends of the levers T and the lifters C', Fig. 4, to actuate the register-wheels, is such that the lifters C' will be quickly raised for that purpose at the beginning of the revolution of the shaft H and cam J, so that the segments F' will be given their forward registering movement by the time said shaft and cam have completed a small part of their revolution, after which the cam will operate to hold the lifters in lifted position during a considerable portion of its revolution, and while the lifters and the register frames and segments actuated by them are thus held in stationary position by the action of the cam J, with the type-wheels likewise held in position to print amounts corresponding to the movements of the segments, the printing is effected, after which the parts are returned to normal position.

The printing devices, besides the type-wheels above described, are carried in a frame secured to the right-hand side plate C of the framework and consisting of an outer side plate $S^5$ and various bars and rods connecting it with the frame-plate C, Figs. 1, 2, 3, 11, 12, and 15.

As seen in Fig. 11, the extreme right-hand end of the shaft $O^5$, which carries the type-wheel $P^5$, is journaled in a fixed plate $T^5$, projecting rearward from a cross-bar or block $U^5$, rigidly secured between the plate $S^5$ and frame-plate C, Figs. 11 and 12. Journaled at its left-hand end in this plate $T^5$ and abutting against the right-hand end of the shaft $O^5$ is a rotary shaft $V^5$, Fig. 3, which has mounted upon it at the left of the plate $T^5$ a series of consecutive-numbering wheels $W^5$, which are advanced one number at each operation of the machine by suitable pawls $X^5$, Fig. 1, actuated by a cam $Y^5$ fast upon the rotary shaft H, heretofore described. There being nothing new in these devices for actuating the consecutive-numbering wheels, they will not be described in detail. Immediately at the right of the wheels $W^5$, as seen in Fig. 11, there is a fixed disk or plate $Z^5$, which bears the type-character "No." at the upper and lower printing-lines. At the right of this fixed disk $Z^5$ are the dating-wheels $A^6$, which are fast upon the ends of three concentric sleeves $B^6$, mounted upon the shaft $V^5$ and extending through and projecting to the right of the frame-plate $S^5$. These sleeves $B^6$ have fast upon their right-hand ends milled thumb-pieces $C^6$, by which they may be turned to change the date. The shaft $V^5$ projects to the right beyond the sleeves $B^6$ and thumb-piece $C^6$, and has fast upon its end a thumb-piece $D^6$, by which it may be turned to reset the consecutive-numbering wheels $W^5$, the usual or any suitable devices for that purpose being interposed between such wheels and the shaft $V^5$.

The machine illustrated in the drawings is equipped for printing upon both a paper record-strip and upon a paper check-strip, as indicated by the provision of the double series of type numbers and characters above described. The paper check-strip is carried in a roll $E^6$, mounted upon a spindle $F^6$, projecting from the framework, and from said roll is led downward between a pair of rollers $G^6$ $H^6$, Fig. 12, thence forward between a second pair of rollers $I^6$ $J^6$, thence on forward across the upper sides of the type-wheels, and thence out through a guide-chute $K^6$, beneath a reciprocating knife $L^6$, carried by a vertically-sliding plate $M^6$, mounted upon the frame-plate C and operated by a cam $N^6$, fast upon the shaft H, said cam operating to depress the plate $M^6$ and cutter $L^6$ at the end of each operation of the machine to shear off the projecting end of the paper check-strip advanced by the feed-rollers, and the spring $O^6$ then serving to reset the plate $M^6$ and cutter $L^6$.

The feed-rollers above mentioned are driven and other parts of the printing mechanism actuated by the rotary shaft P, heretofore described, which extends to the right through the right-hand frame-plate C and across the space between the latter and the frame-plate $S^5$, and projects through and beyond the latter plate. As seen in Fig. 12, this shaft P has fast upon it, adjacent the frame-plate C, a mutilated gear $P^6$, which during a portion of the revolution of the shaft P at each operation of the machine meshes with a pinion $P^7$, fast upon the inner or left-hand end of an inking-roller $Q^6$, Fig. 11. A pinion $P^8$, turning with the roller $Q^6$ at its opposite or outer end, meshes with a pinion $P^9$, fast upon the outer end of the roll $J^6$, heretofore referred to, while the pinion $P^9$ upon the latter roller meshes with a pinion upon the outer end of the roller $I^6$. A pinion $P^{10}$ upon the opposite inner end of the roller $I^6$ meshes with a gear $R^6$, which latter meshes with a pinion upon the inner end of the roller $H^6$, heretofore referred to.

An inking-roller $S^6$, geared to the roller $H^6$, coöperates with it to ink the electrotype secured upon the latter roller, while the inking-roller $Q^6$ serves the same purpose for the roller $J^6$, the roller $G^6$ being the impression-roller coöperating with the roller $H^6$, and the roller $I^6$ the impression-roller coöperating with the roller $J^6$. The rollers $G^6 H^6$ serve to print the desired advertisement or other matter upon one side of the check-strip, while the rollers $I^6 J^6$ serve to print the desired matter upon the opposite side of said strip, with the result that a paper check or ticket is delivered from the machine, which will bear upon one side the matter printed upon it by the type-wheels and also by the rollers $I^6 J^6$, and upon its opposite side the matter printed upon it by the rollers $G^6 H^6$. In the present instance the machine from which the drawings were prepared issues a check such as that shown in Figs. 13 and 14, Fig. 13 being a face view of the check and Fig. 14 a back view.

The record-strip $O^7$ is carried in a supply-roll upon a spindle $O^8$, projecting from the frame-plate C, and is led thence upward over a guide-rod $Z^6$; thence forward beneath the type-wheels and over a guide-rod $O^9$; thence downward around a storage-reel $Q^7$, mounted upon a spindle $Q^8$, projecting from the plate C and provided with a ratchet $Q^9$, with which coöperates a pawl $R^7$, carried by the reciprocating plate $M^6$, to turn the reel at each operation of the machine and advance the record-strip. A spring-pressed holding-pawl $R^8$ coöperates with the ratchet $Q^9$ to prevent backward movement of the reel $Q^7$.

The platens $T^6 U^6$, which coöperate with the type-wheels at the upper and lower printing-points, respectively, are carried by the forward ends of arms $V^6 W^6$, secured to or formed integral with sleeves $X^6 Y^6$, Figs. 12 and 15, mounted upon rods $Z^6$, projecting from the frame-plate C. Fast upon the extreme left-hand end of the sleeve $Y^6$, which carries the arm $W^6$ of the lower platen, is a three-armed lever $A^7$, to whose vertical lower arm is connected a coiled spring $B^7$, whose action tends to throw the arm $W^6$ upward and cause its platen $U^6$ to strike the type-wheels. The sleeve which carries the arm $V^6$ of the upper platen likewise has secured to its left-hand end a lever $C^7$, to whose upper end is connected a coiled spring $D^7$ and whose lower end is connected by devices hereinafter described to the upper end of the upper vertical arm of the lever $A^7$, above referred to. The horizontal forwardly-projecting arm $E^7$ of the lever $A^7$ is turned upward at its forward extremity and bears against the periphery of a cam $F^7$, fast upon the rotary shaft P. This cam is provided with two operating projections separated by an intermediate notch, with the result that at each revolution of the cam the arm $E^7$ will be depressed and then released and thrown upward by the action of the spring $B^7$, and then depressed a second time and released and thrown upward again. At each of such releases of the arm $C^7$ the action of the spring $B^7$ will throw the platen-arm $W^6$ and platen $U^6$ upward, while the connection of the vertical arm of the lever $A^7$ with the lower end of the lever $C^7$ will produce corresponding movements of the upper platen-arm $V^6$ and platen $T^6$, so that at each operation of the machine and revolution of the shaft P and cam $F^7$ the platens will be thrown toward the type-wheels twice in succession and then retracted therefrom.

The type-wheels are inked by a pair of inking-strips $G^7$, Figs. 3, 11, and 12, carried by the forward ends of a pair of arms $H^7$, Fig. 3, which arms are pivoted at their rear ends to vertically-projecting arms $I^7$ upon the front end of a plate $J^7$, mounted to slide back and forth in a horizontal guideway in the frame-plate $S^5$, Figs. 3, 11, and 15. A coiled spring $K^7$ connects the arms $H^7$, while a second coiled spring $L^7$, connected at its right-hand end to the frame-plate $S^5$ and at its left-hand end to the sliding plate $J^7$, serves to retract the latter plate and the inking arms and strips and yieldingly retain them in normal right-hand position. A cam $M^7$, fast upon the rotary shaft P just outside the frame-plate $S^5$, Figs. 3 and 15, coöperates with a projection upon the sliding plate $J^7$ to force the latter to the left at each operation of the machine to carry the inking-strips $J^7$ into position opposite the printing-lines. As the inking-strips $G^7$ are so moved toward the left they ride over and are spread apart against the action of the spring $K^7$ by a pair of curved spring-arms $N^7$, Figs. 3 and 11, secured at their rear ends to the inner side of the frame-plate $S^5$, and at their forward ends bent outwardly to fit in notches in the upper and lower edges of the plate $S^5$. The inking-pads $G^7$ are thrown forward to position immediately above and below the type-wheels, at each operation of the machine, just before the first of the two projections upon the cam $F^7$, Fig. 12, clears the end of the arm $E^7$, and are in such position when said arm is released by the cam, so that as the platens are thrown toward the type-wheels the first time they contact with the inking-strips and press them against the wheels to ink the latter, after which the platens are retracted and the inking-strips withdrawn, and then the platens are thrown against the type-wheels the second time to effect the printing. In their normal rearward position the inking-strips $G^7$ bear against the upper and lower ends of a saturated ink-pad within an ink-fount $O^{71}$, Fig. 12, by which the strips are inked, and from which the strips carry the ink to the type-wheels in the manner described.

The inking-strips and platens and means for actuating them, and their coöperation with each other and with the type-wheels, are substantially the same as in my prior pending application, Serial No. 568,531, filed November 11, 1895, and need not be described more at length here.

It sometimes happens that in the use of a machine of this character it is desired to temporarily discontinue the issuing of the printed checks or tickets, which has heretofore been accomplished by simply withdrawing the check-strip rearward from the feed-rollers which advance it, but in such case the feeding and printing rollers continued their rotation at each operation of the machine, while the upper platen was still permitted, owing to its connection with the lower platen, to hammer against the type-wheels at the upper printing-point at each operation of the machine.

For the purpose of stopping action of the feeding and printing rollers and throwing the upper platen entirely out of operation when it is desired to discontinue the issuing of checks I have provided the following novel devices: The pinion $P^8$ at the right-hand outer end of the roller $Q^6$, Fig. 11, is not fast upon said roller or its spindle, but forms part of a clutch member loose upon the spindle of said roller and adapted to be slid longitudinally thereof. Said clutch member consists of the pinion $P^8$ and a disk $A^8$, fast upon the hub or sleeve of the pinion and provided with a projection or tooth $B^8$, adapted to coöperate with a clutch member $C^8$, fast upon the end of the roller $Q^6$, the member $C^8$ consisting in the present instance of a pinion between whose teeth the projection $B^8$ upon the disk $A^8$ is adapted to fit. Fitting around the hub of the pinion $P^8$, between it and the disk $C^8$, is the forked forward end of a shifter-lever $D^8$, which is pivoted near its rear end upon a support $E^8$, Figs. 11 and 15, projecting from the frame-plate $S^5$. To the rear end of the shifter-lever $D^8$ is connected the left-hand inner end of a sliding rod or pin $F^8$, mounted in a guideway in the frame-plate $S^5$ and provided upon its outer end with a thumb-piece $G^8$. When the pin $F^8$ is pressed inward, the forward end of the lever $D^8$ will be thrown outward and the projection $B^8$ upon the disk $A^8$ be disengaged from the clutch member $C^8$ upon the end of the roller $Q^6$, so that the pinion $P^8$ will be entirely disconnected from said roller. Now it will be remembered that the feed-rollers are driven by the mutilated gear $P^6$, Fig. 12, which meshes with the pinion $P^7$ upon the left-hand inner end of the roller $Q^6$, Fig. 11, the motion imparted to the pinion $P^7$ being transmitted through the roller $Q^6$ and pinions $P^8$ and $P^9$ to the roller $J^6$ and from the roller $J^6$ to the other rollers which are geared to it. It follows, therefore, that when the pinion $P^8$ is disconnected from the roller $Q^6$ by shifting the lever $D^8$ the driving connection between the roller $Q^6$ and the rollers driven by it will be broken, so that the roller $Q^6$ will be the only one turned by the gear $P^6$ so long as the lever $D^8$ remains in shifted position. In this manner and by these means, therefore, the feed-rollers may be thrown out of operation at will by simply pressing in the thumb piece or button $G^8$ upon the end of the pin $F^8$, connected to the rear end of the lever $D^8$, and so long as the parts are allowed to remain in this position the check-strip will not be advanced at any operation of the machine. When it is desired to throw the feed-rollers into operation again, it is only necessary to pull the thumb-piece $G^8$ outward and thereby throw the clutch member of the pinion $P^8$ into engagement with the clutch member $C^8$ upon the end of the roller $Q^6$.

As seen in Figs. 15 and 16, the rear end of the lever $D^8$ has projecting upward from it a pin $H^8$, which fits in a hole in a plate or bar $I^8$, mounted to slide transversely upon the under side of the fixed cross-plate $J^8$ and secured thereto by screws $K^8$, passing through slots in the plate $I^8$ and entering the plate $J^8$. When the thumb-piece $G^8$ is pressed inward, therefore, to disconnect the pinion $P^8$ from the roller $Q^6$, the sliding plate $I^8$ will be slid inward, to the right in Figs. 15 and 16. At its inner end the plate $I^8$ is provided with a forwardly-extending arm $L^8$, Fig. 17, the inner side of whose extreme forward end is beveled, as shown in Fig. 18, to coöperate with a sliding plate $M^8$, mounted upon the outer side of the lever $C^7$, Fig. 12, which is fast upon the inner end of the sleeve $X^6$, which carries the upper platen-arm $V^6$, as heretofore described. The upper end of the sliding plate $M^8$ is beveled to coöperate with the end of the arm $L^8$ of the plate $I^8$, with the result that when the plate $I^8$ is slid inward, toward the right in Figs. 15 and 16, the beveled forward end of its arm $L^8$ will force the plate $M^8$ downward upon the lever $C^7$. Pivoted to the lower end of the lever $C^7$, beneath the plate $M^8$, is a hooked latch $N^8$, connected by a coiled spring $O^8$ to a pin $S^8$ upon the lever $C^7$, by which spring the latch $N^8$ is pulled upward against the lower end of the plate $M^8$. The hooked rear end of the latch $N^8$ coöperates with a pin $T^8$ upon the side of the upper end of the lever $A^7$, Fig. 12, and serves, when the plate $M^8$ and latch $N^8$ are in their normal upper positions, as in Figs. 12 and 17, to connect the lever $A^7$ with the lever $C^7$, with the result that the movements imparted to the lever $A^7$ and lower platen $U^6$ by the cam $F^7$ are transmitted to the lever $C^7$ and upper platen $T^6$, as heretofore described. When, however, the plate $M^8$ on the lever $C^7$ is forced downward by pressing in the button $G^8$, as heretofore described, the latch $N^8$ will be rocked on its pivot and its hook be disengaged from the pin $T^8$ on the lever $A^7$ and maintained out of engagement therewith so long as the parts remain in the position to which they have been moved by the pressing in of the button $G^8$, with the result that the lever $C^7$ and upper platen will be entirely disconnected from the lever $A^7$ and lower platen and will remain at rest during the operation of the machine until the button $G^8$ is pulled outward and the latch $N^8$ allowed to reconnect the levers $A^7$ and $C^7$.

From the foregoing description it will be understood that whenever it is desired to discontinue the issuing of printed checks the pressing in of the thumb piece or button $G^8$ will serve to throw both the feed-rollers and the upper platen out of operation, so that at the succeeding operations of the machine the check-strip will not be advanced and the platen will not be thrown against the type-wheels, and that upon pulling the button outward again the feed-rollers and platen will again be put in operative condition.

It has heretofore been explained that the rollers $H^6$ and $J^6$ are not only feed-rollers, but are printing-rollers as well, each being provided with an electrotype bearing the desired matter.

For the purpose of enabling the electrotypes upon the roller $J^6$ to be readily changed for the purpose of printing different matter upon one side of the checks the following construction is employed, reference being had to Figs. 11 and 11$^a$: The roller $J^6$ and the pinion $P^9$, which is secured to its outer end, are loosely mounted upon a spindle $J^9$, which is journaled at its left-hand end in the frame-plate C and at its right-hand outer end in a cylindrical block $K^9$, Fig. 11, which fits in a cylindrical opening in the frame-plate $S^5$ and has projecting rearward from it and fitting against the outer face of the plate $S^5$ an arm $L^9$, through whose rear end is passed a rod $M^9$, which is screwed into the frame-plate $S^5$, a thumb-piece $N^9$ upon the outer end of the rod fitting against the outer face of the arm $L^9$ and serving to hold the latter and the block $K^9$ in position in and upon the plate $S^5$. The spindle $J^9$ of the roller $J^6$ has fast upon its left-hand end a disk $O^9$, whose hub $R^9$ is provided with a projection $S^9$, adapted to fit in a notch in the end of the roller $J^6$, to thereby connect said roller with the spindle $J^9$, so that the roller and spindle will turn together. When it is desired to remove the roller $J^6$ and substitute therefor another having a different electrotype, it is only necessary to turn the thumb-piece $N^9$ and unscrew the rod $M^9$ and remove it, whereupon the block $K^9$, in which the right-hand end of the spindle $J^9$ of the roller $J^6$ has its bearing, may be readily removed from position, leaving the roller $J^6$ and its pinion $P^9$ free to be slid outward off the spindle $J^9$. To facilitate such removal of the roller $J^6$ from its spindle, the pinion $P^9$ is provided with a threaded hole $T^9$, Fig. 11, adapted to receive the threaded end of a rod inserted through the opening normally occupied by the block $K^9$, by which rod the pinion and roller may be drawn outward off the spindle $J^9$. A convenient rod for thus removing the roller $J^6$ is the rod $M^9$, which serves to hold the block $K^9$ and arm $L^9$ in position upon the frame-plate $S^5$, to which end said rod may be made longer than is necessary for its main function, as seen in Fig. 11, and the extremity of its reduced left-hand portion be threaded to engage the hole $T^9$ in the pinion $P^9$. When the rod $M^9$ is unscrewed by turning its thumb-piece $N^9$ and removed and the block $K^9$ then taken out of place, the end of the rod $M^9$ may be inserted through the opening in the plate $S^5$ and be screwed into the threaded hole in the pinion $P^9$ and the latter and the roller $J^6$ be drawn off the spindle $J^9$ and a new roller be slid onto the spindle and the parts then replaced as before.

For the purpose of obviating the necessity of each roller $J^6$ having its own pinion $P^9$ the latter may be made detachable from the roller, as shown in Fig. 11$^a$, the pinion in this instance being provided on its left-hand side with a projecting hub, which fits in a recess in the end of the roller $J^6$ and is engaged by a set-screw $U^9$, passed through the end of the roller.

When the roller is removed from position in the manner and by the means above described, the set-screw $U^9$ may be loosened and the pinion $P^9$ be disconnected from the roller and applied to the new roller which is to be placed upon the spindle.

Having thus fully described my invention, I claim—

1. In a registering-machine, the combination, with the driving mechanism, of a rotary register-frame carrying a plurality of registers adapted to have various amounts added upon them by the driving mechanism at different operations of the machine, and means for turning said frame to different positions to bring the several registers into coöperative relation with the driving mechanism.

2. In a registering-machine, the combination, with the driving mechanism, of a rotary register-frame carrying a plurality of registers, and means actuated by the driving mechanism for turning said frame to different positions to bring the several registers into coöperative relation with the driving mechanism.

3. In a registering-machine, the combination, with the driving mechanism, of a rotary register-frame carrying a plurality of registers, means for turning said frame to different positions to bring the several registers into coöperative relation with the driving mechanism, and a series of keys corresponding to the several registers and coöperating with the means for turning the register-frame, the operation of one or another of which keys determines which register shall be brought into coöperative relation with the driving mechanism.

4. In a registering-machine, the combination, with the driving mechanism, of a rotary register-frame carrying a plurality of registers, means actuated by the driving mechanism for turning said frame to different positions to bring the several registers into coöperative relation with the driving mechanism, and a series of special keys corresponding to the several registers and also coöperating with the driving mechanism to determine the degree of movement which the latter shall impart to the rotary register-frame and consequently the register which shall be brought to position to coöperate with the driving mechanism.

5. In a registering-machine, the combination, with the driving mechanism, of a rotary register-frame carrying a plurality of registers, and a plurality of cams corresponding to the several registers and actuated by the driving mechanism and coöperating with the rotary register-frame to move the latter different degrees to bring the different registers into position to coöperate with the driving mechanism.

6. In a registering-machine, the combination, with the driving mechanism, of a rotary register-frame carrying a plurality of registers, a plurality of cams corresponding to the several registers and actuated by the driving mechanism, and means for shifting said cams to bring one or another of them into coöperative relation with the rotary register-frame to cause them to turn said frame different degrees and bring the several registers into position to coöperate with the driving mechanism.

7. In a registering-machine, the combination, with the driving mechanism, of a rotary register-frame carrying a plurality of registers, a plurality of cams corresponding to the several registers and actuated by the driving mechanism and coöperating with the rotary register-frame to turn the latter different degrees to bring the different registers into coöperative relation with the driving mechanism, and a series of keys corresponding to the several registers and coöperating with the cams to determine which cam shall coöperate with the register-frame and consequently which register shall be brought to position to coöperate with the driving mechanism.

8. In a registering-machine, the combination, with the driving mechanism, of a rotary register-frame carrying a plurality of registers, a plurality of rotary cams corresponding to the several registers and actuated by the driving mechanism, a lever geared at one end to the rotary frame and coöperating at its other with the rotary cams, and means for shifting the cams to bring one or another of them into coöperative relation with said lever and consequently determine the extent of movement which shall be imparted to the rotary frame and the particular register which shall be brought into position to coöperate with the driving mechanism.

9. In a registering-machine, the combination, with the driving mechanism, of a rotary register-frame carrying a plurality of registers, a plurality of cams mounted upon a rotary shaft so as to turn therewith and slide longitudinally thereof, a lever geared at one end to the rotary frame and adapted to coöperate at its opposite end with the rotary cams, a shifter coöperating with the cams to move them to position for one or another of them to coöperate with the lever, and a plurality of keys corresponding to the several registers and coöperating with the shifter to determine which cam shall coöperate with the lever and which particular register shall be brought to position to coöperate with the driving mechanism.

10. In a registering-machine, the combination of a series of keys for actuating the registering mechanism, a driving mechanism operated independently of said keys, means for connecting the keys at will with such driving mechanism, to cause the latter to actuate the keys, a movable register-frame carrying a plurality of registers adapted to be independently actuated by the keys, and means for moving said frame to different positions to bring the several registers into coöperative relation with the keys.

11. In a registering-machine, the combination of a series of key-levers for actuating the registering mechanism, a movable bar or frame common thereto, means for attaching the respective levers to said bar, means operated independently of the key-levers to give said bar a definite movement at each operation of the machine to cause it to actuate the key-levers attached to it, a movable register-frame carrying a plurality of registers adapted to be independently actuated by the key-levers, and means for moving said frame to different positions to bring one or another of the registers into position to be actuated by said levers.

12. In a registering-machine, the combination of a series of key-levers for actuating the registering mechanism, a movable bar or frame common thereto, means for attaching the levers to said bar upon slightly depressing their front ends, a rotary handle and connections for giving said bar a definite reciprocating movement at each operation of the machine, to actuate the key-levers attached to it, a movable register-frame carrying a plurality of registers adapted to be independently actuated by the key-levers, and means for moving said frame to different positions to bring the several registers into position to be actuated by said levers.

13. In a registering-machine, the combination of a series of keys for actuating the registering mechanism, a driving mechanism operated independently of said keys, means for connecting the keys at will with such driving mechanism, to cause the latter to actuate the keys, a series of reciprocating segments actuated by said keys, a movable register-frame carrying a plurality of registers adapted to be independently actuated by the segments, and means for moving said frame to different positions to bring the several registers into coöperative relation with the segments.

14. In a registering-machine, the combination of a series of key-levers for actuating the registering mechanism, a movable bar or frame common thereto, means for attaching the respective levers to said bar, means operated independently of the key-levers to give said bar a definite movement at each operation of the machine, to cause it to actuate the levers attached to it, a series of reciprocating segments actuated by the key-levers, a movable register-frame carrying a plurality of registers adapted to be independently actuated by the key-levers, and means for moving said frame to different positions to bring the several registers into coöperative relation with the segments.

15. In a registering-machine, the combination of a series of key-levers for actuating the registering mechanism, a movable bar or frame common thereto, means for attaching the key-levers to said bar upon slightly depressing their front ends, a rotary handle and connections for giving said bar a definite reciprocating movement at each operation of the machine, to actuate the key-levers attached to it, a series of reciprocating segments actuated by the key-levers, a movable register-frame carrying a plurality of registers adapted to be independently actuated by the segments, and means for moving said frame to different positions to bring the several registers in coöperative relation with the segments.

16. In a registering-machine, the combination, with the reciprocating segments, of the rotary register-frame mounted in a movable support and carrying a plurality of registers, and means for turning said frame upon its axis to bring one or another of its registers to registering position and for moving said frame toward and from the segments to gear such register with and ungear it from the segments.

17. In a registering-machine, the combination, with the reciprocating segments, of the rotary register-frame mounted upon a movable support and carrying a plurality of registers adapted to be independently actuated by the segments, a plurality of cams corresponding to the several registers and coöperating with said frame to turn the latter to bring one or another of its registers to registering position, and a cam coöperating with the movable support of said frame to move the latter toward and from the segments, to gear its registers with and ungear them from the segments.

18. In a registering-machine, the combination, with the reciprocating segments, of the rotary register-frame mounted in a rocking frame and carrying a plurality of registers adapted to be independently actuated by the segments, and means for turning the register-frame upon its axis, to bring one or another of its registers to registering position, and for rocking its supporting-frame to gear such register with and ungear it from the segments.

19. In a registering-machine, the combination, with the reciprocating segments, of the rotary register-frame mounted in a rocking supporting-frame and carrying a plurality of registers adapted to be independently actuated by the segments, a plurality of rotary cams coöperating with the rotary register-frame to turn the latter upon its axis and bring one or another of its registers to registering position, and a rotary cam coöperating with the rocking supporting-frame to throw such register into and out of gear with the segments.

20. In a registering-machine, the combination, with the reciprocating segments, of the rotary register-frame mounted in a rocking supporting-frame and carrying a plurality of registers adapted to be independently actuated by the segments, a plurality of rotary cams corresponding to the several registers, a lever geared at one end to the rotary frame and adapted to coöperate at its opposite end with the rotary cams, means for shifting said cams to bring one or another of them into position to coöperate with said lever, and another rotary cam coöperating with the rocking supporting-frame to throw the set register into and out of gear with the segments.

21. In a registering-machine, the combination, with the rotary register-frame carrying a plurality of registers, of the rotary shaft B, the cams G″ H″ I″ mounted to turn with and slide upon said shaft, the lever E″ geared at one end to the rotary frame and coöperating at its other with the rotary cams, the shifter-plate L″ for shifting the cams, the plurality of special keys, and the levers intermediate the same and the shifter-plate L″.

22. In a registering-machine, the combination, with the reciprocating segments F′, of the rotary register-frame carrying a plurality of registers and journaled in the side arms or levers O′ P′ of a rocking frame, means for turning the rotary frame to bring one or another of its registers to registering position, and a rotary cam coöperating with the rocking frame to throw such register into gear with the segments F′.

23. In a registering-machine, the combination, with the reciprocating segments F′, of the rotary register-frame mounted in a rocking supporting-frame and carrying a plurality of registers, the rotary cams G″ H″ I″, the lever E″ geared at one end to the rotary frame and coöperating at its opposite end with said cams, means for shifting said cams to bring one or another of them into position to coöperate with the lever, and the rotary cam U′ coöperating with the rocking frame.

24. In a registering-machine, the combination of the key-levers T, the rocking frames E′ carrying the segments F′, the graduated lifters C′ intermediate the levers T and frames E′, a movable register-frame carrying a plurality of registers adapted to be independently actuated by the segments F′, and means for moving said frame to different positions to bring its different registers into position to be actuated by said segments.

25. In a registering-machine, the combination of the key-levers T, the rocking frames E′ carrying the segments F′, the graduated lifters intermediate the levers T and frames E′, a rotary register-frame mounted in a movable support and carrying a plurality of registers adapted to be independently actuated by the segments F', and means for turning said frame to bring one or another of its registers to registering position and for moving its support to throw such register into and out of gear with the segments.

26. In a registering-machine, the combination of the key-levers T, the rocking frames E' carrying the segments F', the graduated lifters C' intermediate the levers T and frames E', the movable bar or frame L, means for attaching the levers T to said bar at will and for giving said bar a definite reciprocating movement at each operation of the machine, a movable register-frame carrying a plurality of registers adapted to be independently actuated by the segments F', and means for moving said frame to different positions to bring one or another of its registers into position to be actuated by said segments.

27. In a registering-machine, the combination of the key-levers T, the rocking frames E' carrying the segments F', the graduated lifters C' intermediate the levers T and frames E', the movable bar or frame L, means for attaching the levers T to said bar at will, a rotary handle and connections for giving said bar a definite reciprocating movement at each operation of the machine, a rotary register-frame mounted in a movable support and carrying a plurality of registers adapted to be independently actuated by the segments F', and means for turning said frame to bring one or another of its registers to registering position and for moving its support to throw such register into and out of gear with the segments.

28. In a registering-machine, the combination, with a rotary register-frame carrying a plurality of registers each consisting of a plurality of registering-wheels mounted on a shaft, and means for turning it to different positions, to bring one or another of its registers into registering position, of an automatic stop coöperating with said frame to arrest it at the end of its forward or setting movement.

29. In a registering-machine, the combination, with a rotary register-frame carrying a plurality of registers each consisting of a plurality of registering-wheels mounted on a shaft, and means for turning it to different positions, to bring one or another of its registers to registering position, of an automatic stop coöperating with said frame to arrest it at the end of its forward or setting movement, and means for positively holding the frame in set position while the register is being actuated.

30. In a registering-machine, the combination, with a rotary register-frame carrying a plurality of registers, and means actuated by the driving mechanism for turning it to different positions to bring one or another of its registers to registering position, of an automatic stop actuated by the driving mechanism to arrest the frame at the end of its forward or setting movement, and means controlled by the driving mechanism for holding said frame in set position while its register is being actuated and releasing it when the registration is completed.

31. In a registering-machine, the combination, with the rotary register-frame carrying a plurality of registers, and means for turning it to different positions to bring one or another of its registers to registering position, of a movable stop, and a cam operated by the driving mechanism to throw said stop into the path of the rotary frame and arrest it at the end of its forward or setting movement.

32. In a registering-machine, the combination, with the rotary register-frame carrying a plurality of registers, and means for turning it to different positions to bring one or another of its registers to registering position, of a shouldered disk or ratchet turning with said frame, a holding-pawl coöperating with said disk to hold the frame in set position while its register is being actuated, and a rotary cam actuated by the driving mechanism to disengage said pawl from the disk and release the rotary frame after the registration is completed.

33. In a registering-machine, the combination, with the rotary register-frame carrying a plurality of registers, and means actuated by the driving mechanism for turning it to different positions to bring one or another of its registers to registering position, of a movable stop, a rotary cam coöperating therewith to throw the stop into the path of the frame to arrest the latter at the end of its forward or setting movement, a shouldered disk or ratchet turning with the frame, a holding-pawl coöperating with said disk to hold the frame in set position while the register is being actuated, a rotary cam coöperative with said pawl to disengage it from the disk after the registration is completed, and a resetting-spring for returning the rotary register-frame to normal position.

34. In a registering-machine, the combination, with the rotary register-frame carrying a plurality of registers, and means for turning it to different positions, to bring one or another of its registers into registering position, of the rocking stop-frame $A^3$ provided with the arm $C^3$, and the rotary cam $Z''$ coöperating with said arm to throw the frame $A^3$ into the path of the rotary frame to arrest the latter at the end of its forward or setting movement.

35. In a registering-machine, the combination, with the rotary register-frame carrying a plurality of registers, the rotary cams $G''$ $H''$ $I''$, and means intermediate said cams and frame for causing the different cams to turn the frame to different positions, to bring one or another of its registers into registering position, of the rocking stop-frame $A^3$ provided with the arm $C^3$, and the rotary cam $Z''$ coöperating with said arm to throw the stop-frame $A^3$ into the path of the rotary register-frame, to arrest the latter at the end of its forward or setting movement imparted by one of the cams $G''$ $H''$ $I''$.

36. In a registering-machine, the combination, with the rotary register-frame carrying a plurality of registers, of the shouldered disk or ratchet $H^3$ turning with said frame, the pawl-lever $I^3$ coöperating with the disk $H^3$ to hold the rotary frame in its different registering positions, and the rotary cam $J^3$ coöperating with the lever $I^3$ to release the rotary frame.

37. In a registering-machine, the combination, with the rotary register-frame carrying a plurality of registers, and means for turning it to different positions to bring its different registers into registering position, of the rocking stop-frame $A^3$ provided with the arm $C^3$, the rotary cam $Z''$ coöperating with the arm $C^3$ to throw the frame $A^3$ into the path of the rotary frame, to arrest the latter at the end of its forward or setting movement, the shouldered disk or ratchet $H^3$ turning with the rotary frame, the pawl-lever $I^3$ coöperating with the disk $H^3$ to hold the rotary frame in its different registering positions, and the rotary cam $J^3$ coöperating with the lever $I^3$ to disengage it from the disk $H^3$.

38. The combination of a rotary disk, as $G^3$, provided with a recess or cut-away space, and an arm or lever, as $I^3$, carrying a spring-pressed pin, as $L^3$, adapted to coöperate with the disk $G^3$ and its recess in the manner described.

39. The combination of a rotary member, as the disk $H^3$, a rotary disk $G^3$ turning with the member $H^3$ beside the same and provided with a recess or cut-away space, a movable member, as the lever $I^3$, adapted to engage the disk $H^3$ and provided with a spring-pressed pin adapted to coöperate with the disk $G^3$ and its recess, and means for disengaging the end of the lever $I^3$ from the disk $H^3$ and permitting the pin $L^3$ to be moved across the periphery of the disk $G^3$, substantially as described.

40. In a registering-machine, the combination, with the rotary register-frame carrying a plurality of registers, of the shouldered disk or ratchet $H^3$ and the disk $G^3$ turning with the frame, the disk $G^3$ being provided with the recess or cut-away space, the pawl-lever $I^3$ coöperating with the disk $H^3$ to hold the rotary frame in its different registering positions and provided with the spring-pressed pin $L^3$ coöperating with the disk $G^3$, and the rotary cam $J^3$ coöperating with the lever $I^3$ to disengage the latter from the disk $H^3$.

41. In a registering-machine, the combination, with a rotary register-frame carrying a plurality of registers, each provided with transfer devices intermediate its several wheels, and means for turning the rotary frame to bring one or another of its registers to registering position, of a plurality of rotary cams located in fixed position relatively to the movement of said rotary frame and adapted to coöperate with the transfer devices of the register which is brought to registering position by the turning of the frame.

42. In a transfer mechanism, the combination, with a primary and a secondary registering-wheel, the primary or lower wheel being provided with a projection and the secondary or higher wheel being provided with a ratchet, of an intermediate lever $R^3$ provided with the spring-pressed pin $T^3$ and with the latch $V^3$ coöperating with said pin and with the projection of the lower wheel, means coöperating with the pin $T^3$ when the latter is projected from the lever $R^3$, to rock said lever, and a transfer-pawl actuated by the lever and coöperating with the ratchet of the higher wheel.

43. In a transfer mechanism, the combination, with a primary and a secondary register-wheel, the primary or lower wheel being provided with a projection, and the secondary or higher wheel being provided with a ratchet, of an intermediate lever $R^3$ carrying at one end the pawl $S^3$ coöperating with the ratchet of the higher wheel, and carrying at its opposite end the spring-pressed pin $T^3$ and the latch $V^3$ coöperating with said pin and with the projection of the lower register-wheel, and means, as a rotary cam, coöperating with the pin $T^3$ when the latter is projected from the lever $R^3$, to rock the latter and cause the pawl $S^3$ to turn the higher register-wheel.

44. In a transfer mechanism, the combination, with a primary and a secondary register-wheel, the former provided with a tooth or projection and the latter with a ratchet, of a lever $R^3$ intermediate said wheels, a spring-pressed sliding pin $T^3$ fitted in a transverse housing in one end of said lever, a latch $V^3$ coöperating with said pin to normally hold it within its housing and also coöperating with the tooth or projection of the primary registering-wheel to release the pin and permit the spring to project it from its housing when said wheel completes a revolution, a rotary cam $A^4$ adapted to strike the pin $T^3$ when projected from its housing, to rock the lever $R^3$, and provided with a beveled or cam surface adapted to force the pin back into its housing after the cam has rocked the lever, and a transfer-pawl actuated by the lever and coöperating with the ratchet of the secondary wheel.

45. In a registering-machine, the combination, with the rotary register-frame carrying a plurality of registers, transfer devices between the wheels of each register, each set for action by the revolution of the next lower wheel in the series, means for turning the rotary frame to bring one or another of its registers to registering position, the rotary shaft $Z^3$, and the cams $A^4$ turning therewith and adapted to coöperate with the transfer devices set for action in the register brought to registering position, whereby when the rotary frame is turned to bring one or another of its registers to registering position the wheels of such register are actuated by the driving mechanism and the transfer devices by the rotary cams while the register remains in such position.

46. In a registering-machine, the combination, with the rotary register-frame carrying a plurality of registers, transfer devices intermediate the wheels of each register, embodying the pawl-levers $R^3$ having the spring-pressed pins $T^3$ operated in the manner described, and means for turning the rotary frame to bring one or another of its registers to registering position, of the rotary shaft $Z^3$ mounted in fixed position, and the cams $A^4$ carried by said shaft and coöperating with the pins $T^3$ to rock the levers $R^3$ and to restore the pins $T^3$ to normal position, as set forth.

47. In a registering-machine, the combination, with the fixed or main frame of the machine, of a movable frame carrying a plurality of registers, and resetting devices mounted upon the fixed frame and adapted to coöperate with the several registers when the latter are brought into position for that purpose by movement of their frame.

48. In a registering-machine, the combination, with the fixed or main frame of the machine, of a rotary register-frame carrying a plurality of registers, and resetting devices mounted upon the fixed frame and adapted to coöperate with the several registers when the latter are brought to position for that purpose by turning the rotary frame.

49. In a registering-machine, the combination, with the fixed or main frame of the machine, of a rotary register-frame carrying a plurality of registers, resetting devices mounted upon the fixed frame, a handle for turning the rotary frame to connect therewith so that successive strokes of the handle will bring the several registers successively into position to be reset by the resetting devices, and means for holding the register-frame in position for the resetting devices to coöperate with its registers.

50. In a registering-machine, the combination, with a rotary register-frame carrying a plurality of registers each mounted upon a rotary shaft and having interposed between it and the shaft suitable means for causing the shaft to pick up the registering-wheels and carry them with it when turned in one direction, of the longitudinally-movable rotary resetting-shaft $E^4$ mounted in fixed position relatively to rotation of the register-frame and adapted to coöperate with the shafts of the respective registers when the latter are successively brought into line with the shaft $E^4$, to reset the respective registers to initial position.

51. In a registering-machine, the combination, with a rotary register-frame carrying a plurality of registers each mounted upon a rotary shaft and having interposed between it and the shaft suitable means for causing the shaft to pick up the registering-wheels and carry them with it when turned in one direction, of the longitudinally-movable rotary resetting-shaft $E^4$ adapted to coöperate with the shafts of the respective registers to reset the latter, a spring pressing the shaft $E^4$ longitudinally in one direction and yieldingly holding it in normal position, and means for maintaining the shaft in operative engagement with the shaft of the register which is being reset after the resetting-shaft has been engaged with such registering-shaft and turned from normal position.

52. In a registering-machine, the combination, with a rotary register-frame carrying a plurality of registers each mounted upon a rotary shaft and having interposed between it and the shaft suitable means for causing the shaft to pick up the registering-wheels and carry them with it when turned in one direction, of the longitudinally-movable rotary resetting-shaft $E^4$ mounted in a bearing $D^4$ and provided with a lug $J^4$ coöperating in the manner described with the bearing $D^4$, and with a spring $I^4$ tending to hold the shaft $E^4$ in normal position, the shaft $E^4$ coöperating with the shafts of the respective registers in the manner described to reset the registers.

53. In a registering-machine, the combination, with the rotary register-frame carrying a plurality of registers, each mounted upon a rotary shaft and having interposed between it and the shaft suitable means whereby the shaft is caused to pick up the register-wheels and carry them with it when turned in one direction, and each register being provided with transfer devices embodying the levers $R^3$ having the spring-pressed pins $T^3$, of the longitudinally-movable rotary resetting-shaft $E^3$ coöperating in the manner described with the register-shafts, to reset the registers, the rotary cam $O^4$, the clutch between said cam and the resetting-shaft $E^4$ by which when the shaft $E^4$ is engaged with a register-shaft and turned it will carry the cam $O^4$ with it, the rock-shaft $K^4$ carrying the arms $R^4$ adapted to coöperate with the pins $T^3$ of the transfer devices, and means intermediate the cam $O^4$ and rock-shaft $K^4$ for causing the rotation of the cam to rock the shaft, for the purpose described.

54. In a registering-machine, the combination of the rotary register-frame carrying a plurality of registers, the hand-lever $W^4$, the toothed wheel $V^4$ turning with the rotary register-frame, the pawl $Y^4$ carried by the lever $W^4$ and coöperating with said wheel, means for holding the register-frame in the different positions to which it is turned by operations of the lever $W^4$, and resetting devices for the respective registers mounted in fixed position and adapted to coöperate with the registers when the rotary frame is turned by the operations of the lever $W^4$ to bring its registers into resetting position.

55. In a registering-machine, the combination of the rotary register-frame carrying a plurality of registers, the hand-lever $W^4$, the toothed wheel $V^4$ turning with the rotary register-frame, the pawl $Y^4$ carried by the lever $W^4$ and coöperating with the wheel $V^4$ and with the disengaging-stop $A^5$, and resetting devices mounted in fixed position and coöperating with the respective registers when the latter are brought to resetting position by operations of the lever $W^4$.

56. In a registering-machine, the combination of the rotary register-frame carrying a plurality of registers and mounted in a movable support, the wheel $V^4$ mounted to turn upon a fixed support and geared to the rotary register-frame, the hand-lever $W^4$ fulcrumed upon the axis of the wheel $V^4$ and carrying the pawl $Y^4$ coöperating with the wheel $V^4$, and resetting devices for the registers mounted in fixed position and adapted to coöperate with the respective registers when the latter are brought to resetting position by operation of the lever $W^4$.

57. In a registering-machine, the combination of the rotary register-frame carrying a plurality of registers and mounted upon the shaft $Q'$ journaled in the rocking frame, the pinion $W'$ fast upon the shaft $Q'$ and meshing with the gear $W'$ mounted to turn upon or with a fixed shaft or sleeve, and means coöperating with the gear $W'$ to turn the latter and the rotary register-frame, and permit said frame to move with the rocking frame.

58. In a registering-machine, the combination of the rotary register-frame carrying a plurality of registers and mounted upon the rotary shaft $Q'$ journaled in the rocking frame, the rotary member $X''$ mounted to turn in fixed position, the pinion $V'$ turning with the shaft $Q'$ and meshing with the gear $W'$ turning with the member $X''$, the lever $E''$ geared at one end to the member $X''$, the rotary cams $G''$ $H''$ $I''$ coöperating with the opposite end of the lever, means for shifting the positions of said cams to cause one or another of them to coöperate with the lever, and a rotary cam $U'$ coöperating with the rocking support of the rotary register-frame.

59. In a registering-machine, the combination, with a rotary register-frame carrying a plurality of registers, of an indicator geared to said rotary frame and operating to indicate the positions of the several registers carried by the latter.

60. In a registering-machine, the combination, with the rotary register-frame carrying a plurality of registers, of the rotary indicator-wheel $C^5$ geared to said frame and bearing a series of signs corresponding to the respective registers and adapted to be moved into position opposite the respective registers as the latter are brought to resetting position.

61. In a registering and printing machine, the combination of a rotary register-frame carrying a plurality of registers, a type-carrier bearing a series of type-characters corresponding to the several registers, means for turning the register-frame to bring one or another of its registers to registering position and for moving the type-carrier to bring to printing position its character corresponding to the register brought to registering position, and a platen coöperating with the type-carrier to print such character upon a paper strip or ticket.

62. In a registering and printing machine, the combination of a rotary register-frame carrying a plurality of registers, a type-carrier geared to said frame and bearing a series of type-characters corresponding to the several registers, means for turning the register-frame to bring one or another of its registers to registering position and to thereby move the type-carrier to bring to printing position the type-character corresponding to the register brought to registering position, and a platen coöperating with the type-carrier.

63. In a registering and printing machine, the combination, with the driving mechanism, of a rotary register-frame carrying a plurality of registers, means for turning said frame to bring one or another of its registers into position to be actuated by the driving mechanism, a series of type-carriers actuated by the driving mechanism to present at the printing-line type-numbers representing the amount being registered, a special type-carrier bearing type-characters corresponding to the several registers and operated by the means for turning the rotary frame, so that when said frame is turned to bring one or another of its registers to registering position said type-carrier will be moved to bring to the printing-line its character corresponding to such register, and a platen coöperating with the type-carriers.

64. In a registering and printing machine, the combination, with the reciprocating segments and the cash type wheels or carriers geared thereto, of a rotary register-frame carrying a plurality of registers, means for turning said frame to bring one or another of its registers into position to be actuated by the segments, a special type wheel or carrier bearing a series of type-characters corresponding to the several registers and operated by the means for turning the rotary register-frame, so as to bring to the printing-line its character corresponding to the register which is brought to registering position, and a platen coöperating with the type-carriers.

65. In a registering and printing machine, the combination, with the reciprocating segments and the cash type wheels or carriers geared thereto, of a rotary register-frame carrying a plurality of registers, means for turning said frame to bring one or another of its registers to position to be actuated by the segments, a special type-carrier geared to said rotary frame so as to be turned by the movement of the latter to bring to the printing-line its type-character corresponding to the register which is brought to registering position, and a platen coöperating with the type-carriers.

66. In a registering and printing machine, the combination, with the reciprocating segments and the cash type wheels or carriers geared thereto, of a rotary register-frame carrying a plurality of registers, a series of rotary cams, a lever geared at one end to the rotary frame and coöperating at its opposite end with said cams, means for shifting said cams to cause one or another of them to actuate the lever, a special type-carrier geared to said lever and bearing type-characters corresponding to the several registers, and a platen coöperating with the type-carriers.

67. In a registering and printing machine, the combination, with the reciprocating segments and the cash type wheels or carriers geared thereto, of a rotary register-frame carrying a plurality of registers, a series of rotary cams, a lever geared at one end to the rotary frame and coöperating at its opposite end with said cams, a plurality of special keys corresponding to the several registers, means intermediate said keys and the rotary cams for shifting the latter by the operations of said keys, to cause one or another of the cams to actuate the lever, a special type-carrier geared to said lever, and a platen coöperating with the type-carriers.

68. The combination of the reciprocating segments F', the rotary register-frame carrying a plurality of registers, the shaft $O^5$ geared to said frame, the type-wheel $P^5$ carried by the shaft $O^5$, the concentric sleeves $Q^5$ surrounding the shaft $O^5$ and geared to the segments F', the type-wheels $R^5$ fast upon the respective sleeves, and a platen coöperating with the type-wheels $P^5$ and $R^5$.

69. The combination of the reciprocating segments F', the rotary register-frame carrying a plurality of registers, the lever E'' geared to said frame, the rotary cams G'' H'' I'' coöperating with the lever E'', the rotary shaft $O^5$ geared to said lever and carrying the type-wheel $P^5$, the concentric sleeves $Q^5$ surrounding the shaft $O^5$ and geared at one end to the segments F' and carrying at their other the type-wheels $R^5$, and a platen coöperating with the type-wheels.

70. The combination of the reciprocating segments F', the rotary register-frame carrying a plurality of registers, the lever E'' geared at one end to said frame, the rotary cams G'' H'' I'' coöperating with the other end of said lever, the shifter-plate L'' for shifting the cams, the special keys and levers intermediate the same and shifter-plate L'', the rotary shaft $O^5$ geared to the lever E'' and carrying the type-wheel $P^5$, the concentric sleeves $Q^5$ surrounding the shaft $O^5$ and geared at one end to the segments F' and carrying at the other the type-wheels $R^5$, and a platen coöperating with the type-wheels.

71. The combination of the lever E'', a rotary member geared to one end of said lever, the rotary cams G'' H'' I'' coöperating with the other end of said lever, and means for shifting said cams to bring one or another of them into position to actuate the lever.

72. The combination of the lever E'', the type-wheel $P^5$ geared to one end of said lever, the rotary cams G'' H'' I'' coöperating with the other end of said lever, means for shifting said cams to bring one or another of them into position to actuate the lever, and a platen coöperating with the type-wheel.

73. The combination of the lever E'', the rotary cams G'' H'' I'' coöperating therewith, the shifter-plate L'' for shifting the cams, and the special keys and the levers intermediate the same and the plate L''.

74. The combination of the gear-wheel F, the mutilated gear E coöperating therewith, the toothed wheel $F^9$ turning with the gear F, the cam $G^9$ turning with the gear E, and the locking-lever $E^9$ intermediate the wheel $F^9$ and cam $G^9$ for locking the gear F when not in mesh with the gear E.

75. In a cash-register and check-printer, the combination, with the type-wheels, the platen, and the feeding mechanism for advancing the check-strip, of means for throwing the platen and feeding mechanism out of operation at will when it is desired to discontinue the printing of checks.

76. In a cash-register and check-printer, the combination, with the type-wheels, and the platen and its actuating devices, of means for connecting the platen with and disconnecting it from its actuating devices at will, for the purpose described.

77. In a cash-register and check-printer, the combination, with the type-wheels, the feed-rollers for advancing the check-strip, and the driving mechanism geared to said rollers, of means for throwing said rollers and the driving mechanism out of gear with each other at will when it is desired to discontinue the issuing of checks.

78. In a cash-register and check-printer, the combination, with the type-wheels, the feed-rollers for advancing the check-strip, and the driving mechanism for said rollers, of a clutch intermediate one of said rollers and the driving mechanism, and means for operating said clutch to throw such roller into and out of gear with the driving mechanism, for the purpose described.

79. The combination, with the type-wheels, the platen and its actuating devices, the feed-rollers for advancing the check-strip, and the driving mechanism geared to said rollers, of means for disconnecting the platen from its actuating devices and throwing the feed-rollers out of gear with the driving mechanism by the operation of a single handle or device.

80. The combination of the type-wheels, the two platens coöperating with opposite sides thereof, the levers $C^7$ and $A^7$ moving with the respective platens, the cam $F^7$ for actuating the lever $A^7$, and the latch for connecting and disconnecting the levers $C^7$ and $A^7$ at will.

81. The combination of the type-wheels, the two platens coöperating with opposite sides thereof, the levers $C^7$ and $A^7$ moving with the respective platens, the cam $F^7$ for actuating the lever $A^7$, the latch for connecting and disconnecting the levers $C^7$ and $A^7$ at will, and the thumb-piece $G^8$ and connections for controlling said latch.

82. The combination of the type-wheels, the platens, the levers $A^7$ $C^7$, the rotary cam coöperating with one of said levers, the latch $N^8$ carried by one lever and coöperating with the pin $T^8$ on the other, the sliding plates $L^8$ $M^8$, and means for moving the plate $L^8$.

83. The combination of the type-wheels, the feed-rollers $I^6$ $J^6$ geared to the driving mechanism, the clutch intermediate one of said rollers and the driving mechanism, the platens, the levers $A^7$ $C^7$, the rotary cam coöperating with one of said levers, the latch for connecting and disconnecting said levers, a shifter for the clutch and a trip or disengaging plate for the latch, and means for simultaneously operating the shifter and trip to throw the feed-rollers and one platen out of operation.

84. The combination of the frame-plate $S^5$, the removable block $K^9$ fitting in an opening therein, the spindle $J^9$ mounted at one end in the block $K^9$, and the roller $J^6$ mounted upon the spindle $J^9$ and adapted to be removed through the opening in which fits the block $K^9$.

85. The combination of the frame-plate $S^5$, the removable block $K^9$ fitting in an opening therein and held in place by the screw-rod $M^9$ and thumb-piece $N^9$, the spindle $J^9$ mounted at one end in the block $K^9$, and the removable roller $J^6$ mounted upon the spindle $J^9$ and provided with the threaded hole $T^9$ adapted to receive the threaded end of the rod $M^9$, for the purpose described.

86. The combination of the frame-plate $S^5$, the removable block $K^9$ fitting in an opening therein, the spindle $J^9$ mounted at one end in said block, and the removable roller $J^6$ mounted upon said spindle and provided with the detachable driving-pinion $P^9$.

87. The combination, with the type-wheels and platen, of the combined feeding and printing rollers $I^6$ $J^6$ for advancing the check-strip and printing upon that side of it next the type-wheels, and the combined printing and feed rollers $G^6$ $H^6$ for printing upon the opposite side of said strip, whereby checks may be issued bearing upon one side the matter printed by the rollers $I^6$ $J^6$, together with the amount of the transaction printed by the type-wheels, and upon their opposite sides the matter printed by the rollers $G^6$ $H^6$, substantially as described.

THOMAS CARNEY.

Witnesses:
CHAS. A. LUNDGREN,
ALVAN MACAULEY.